(12) United States Patent
Zimny et al.

(10) Patent No.: US 11,658,865 B2
(45) Date of Patent: May 23, 2023

(54) UPDATING DEVICES IN A LOCAL NETWORK OF INTERCONNECTED DEVICES

(71) Applicant: Delphian Systems, LLC, Buffalo Grove, IL (US)

(72) Inventors: Arkadiusz Zimny, Hampshire, IL (US); Ashok Hirpara, Carol Stream, IL (US); Thomas D. Johnson, Poplar Grove, IL (US)

(73) Assignee: Delphian Systems, LLC, Buffalo Grove, IL (US)

( * ) Notice: Subject to any disclaimer, the term of this patent is extended or adjusted under 35 U.S.C. 154(b) by 466 days.

(21) Appl. No.: 15/926,225

(22) Filed: Mar. 20, 2018

(65) Prior Publication Data

US 2019/0296969 A1 Sep. 26, 2019

(51) Int. Cl.
*H04L 12/24* (2006.01)
*H04W 12/08* (2021.01)
*H04W 12/06* (2021.01)
*H04W 76/11* (2018.01)
*H04L 41/0803* (2022.01)
*H04L 9/40* (2022.01)

(52) U.S. Cl.
CPC ......... *H04L 41/0803* (2013.01); *H04W 12/06* (2013.01); *H04W 12/08* (2013.01); *H04W 76/11* (2018.02); *H04L 63/10* (2013.01)

(58) Field of Classification Search
CPC . H04L 29/06047; H04L 41/28; H04L 63/101; H04L 49/1584; H04L 5/0055; H04W 76/11; H04W 12/08; H04W 84/18; H04W 16/18; G06F 21/44
See application file for complete search history.

(56) References Cited

U.S. PATENT DOCUMENTS

| | | | |
|---|---|---|---|
| 6,754,829 B1 * | 6/2004 | Butt | G06F 21/33 726/8 |
| 8,249,579 B2 | 8/2012 | Nass et al. | |
| 8,620,268 B2 * | 12/2013 | Metivier | G07C 9/00817 455/418 |
| 2007/0037566 A1 * | 2/2007 | D'Agostino | H04W 48/04 455/421 |
| 2015/0194000 A1 | 7/2015 | Schoenfelder et al. | |
| 2015/0245182 A1 * | 8/2015 | Scagnol | G06F 21/44 370/312 |
| 2015/0312531 A1 * | 10/2015 | Samad | H04N 7/186 348/143 |
| 2016/0156604 A1 * | 6/2016 | Oh | H04L 63/101 726/4 |
| 2017/0344923 A1 * | 11/2017 | Pike | G06Q 10/10 |

(Continued)

*Primary Examiner* — Muhammad Raza
(74) *Attorney, Agent, or Firm* — Banner & Witcoff, Ltd.

(57) ABSTRACT

Methods, systems, apparatuses, and computer-readable media for updating an operational parameter of a device of a local network of interconnected devices are provided. A user-operated device, in association with an attempt to access the device, may provide an update to the operational parameter of the device. The user-operated device may send the update to the operational parameter before sending the device an operational command. The device may apply the update received from the user-operated device before performing an operation corresponding to the operational command.

20 Claims, 15 Drawing Sheets

(56) References Cited

U.S. PATENT DOCUMENTS

| | | | |
|---|---|---|---|
| 2018/0232976 A1* | 8/2018 | Schoenfelder | H04L 63/08 |
| 2019/0028478 A1* | 1/2019 | Love | G07C 9/00571 |
| 2020/0002977 A1* | 1/2020 | Russi-Vigoya | E05B 39/04 |

* cited by examiner

```
<DeviceUpdateInformation DeviceNodeId="b9dbf1d4-e26e-4ae4-be36-f6d875563310"
    SequenceId="022482" LocalAuthNEnabled="True" AssignedBridge="True"
    Disabled="False"/>
    <AuthorizedUserDevices>
        <AuthorizedUserDevice Id="6a19e8e0-73c4-11e7-8cf7-a6006ad3dba0" />
        <AuthorizedUserDevice Id="9f63fec8-73c4-11e7-8cf7-a6006ad3dba0" />
        <AuthorizedUserDevice Id="256b661a-1b3a-4af2-ab62-08496b4ffc34" />
    </AuthorizedUserDevices>
</DeviceUpdateInformation>
```

FIG. 9B

UPDATING DEVICES IN A LOCAL NETWORK OF INTERCONNECTED DEVICES

TECHNICAL FIELD

This application is generally related to computer networks. More specifically, this application is related to multicomputer data transferring. In particular, this application is related to network computer configuring in which operating characteristics are assigned to the computing devices of the network.

BACKGROUND

The proliferation of network-enabled devices continues to grow in terms of both volume and type. The "Internet of Things" (or IoT) refers to the collection of devices (e.g., "smart devices"), objects (e.g., "smart objects"), and sensors having networking capabilities. IoT principles are applied in a variety of areas such as, for example, home automation. It is estimated that within a few years, the average household will include dozens of network-enabled devices and the worldwide total of network-enabled devices will reach tens of billions.

As with traditional computing, the security of such devices is a concern. The introduction of new types of network-enabled devices introduces new challenges with respect to securing those devices. Such challenges include, among others, determining which individuals are authorized to interact with a device and determining what interactions an individual is authorized to perform. Furthermore, different types of devices may implicate different security concerns. While some devices may only transmit information read and/or collected by other devices (e.g., sensor-type devices) thus implicating relatively minor security concerns, other devices may provide and/or house sensitive information or be user-controlled thus implicating relatively major security concerns. As a result, new solutions to provide security for network-enabled devices are needed.

SUMMARY

To overcome the challenges described above, various techniques are provided for updating the operational parameters of a computing device (referred to below as a device node) in a local network of interconnected devices. These techniques may be employed to ensure that only authorized user-operated devices are granted access to the device nodes of a local network of interconnected devices. In one example, a server generates an update package for a device node (e.g., an electronic door lock) and transmits the update package to a user-operated device (e.g., a smartphone). The update package may, for example, include an updated list of those user-operated devices that are authorized to access the device node. Having received the update package, the user-operated device, in this example, transmits the update package to the device node. After receiving the update package, the device node evaluates whether the received update package is more recent than a previously received update package and, if so, updates its internally stored list of authorized user-operated devices based on the updated list of user-operated devices included in the update package.

The user-operated device may, in some examples, transmit the update package to the device node when initially requesting access to the device node and prior to an attempt to authorize the user-operated device. In this way, the device node can advantageously receive updates to its operational parameters close in time and prior to granting a user-operated device access to the device node. And even if the user-operated device is ultimately denied access to operate the device node, the user-operated device may nevertheless connect to the device node and deliver an update package to update that device node. The updated list of user-operated devices may thus be employed to indicate new user-operated devices that have been authorized to access a device node and thus should be granted access to the device node. Similarly, the updated list of user-operated devices may be employed to revoke authorization from existing user-operated devices and thus should be denied access to the device node. It should thus be appreciated that, by delivering the update package as part of a request to access a device node, a user-operated device that is no longer authorized to access that device node may itself deliver the update package that causes the subsequent authorization of that user-operated device to be denied. In other words, the mere request by an newly unauthorized user-operated device to access a device node may cause the device node to determine that the user-operated device is no longer authorized to access the device node and, as a result, deny the request. The security of the device node is thus preserved.

The update package may be employed to deliver updates to additional and alternative operational parameters of a device node. For example, the update package may deliver updates to one or more of a parameter indicating whether local authentication is enabled at the device node, a parameter indicating whether the device node is assigned to a gateway device (also referred to as a bridge device below), and a parameter indicating whether the device node is enabled or disabled. Further to the advantages noted above, the mere request by a user-operated device to access a device node may disable that device node if an update package delivered by that user-operated device updates the enabled/disabled parameter at the device node.

A server may deliver an update package to a device node via additional and alternative communication paths. For example, the local network of interconnected devices may be a wireless mesh network that includes multiple device nodes and a gateway device that bridges the mesh network to the server via a wide area network (WAN) such as the Internet. The device nodes and the gateway device of the wireless mesh network may communicate with each other using a wireless mesh networking protocol in which messages are routed through various device nodes. The server, in this example, may deliver an update package for one of the device nodes by transmitting the update package to the gateway device which then routes the update package through the wireless mesh network to the target device node.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements. It is to be appreciated that the figures, as shown herein, are not necessarily drawn to scale, wherein some of the elements may be drawn merely for the purpose of clarity. Also, reference numerals may be repeated among the various figures to show corresponding or analogous elements.

FIG. 9B depicts an example of an implementation of a message indicating update information for a device node in accordance with aspects described herein.

DETAILED DESCRIPTION

Figure 1:
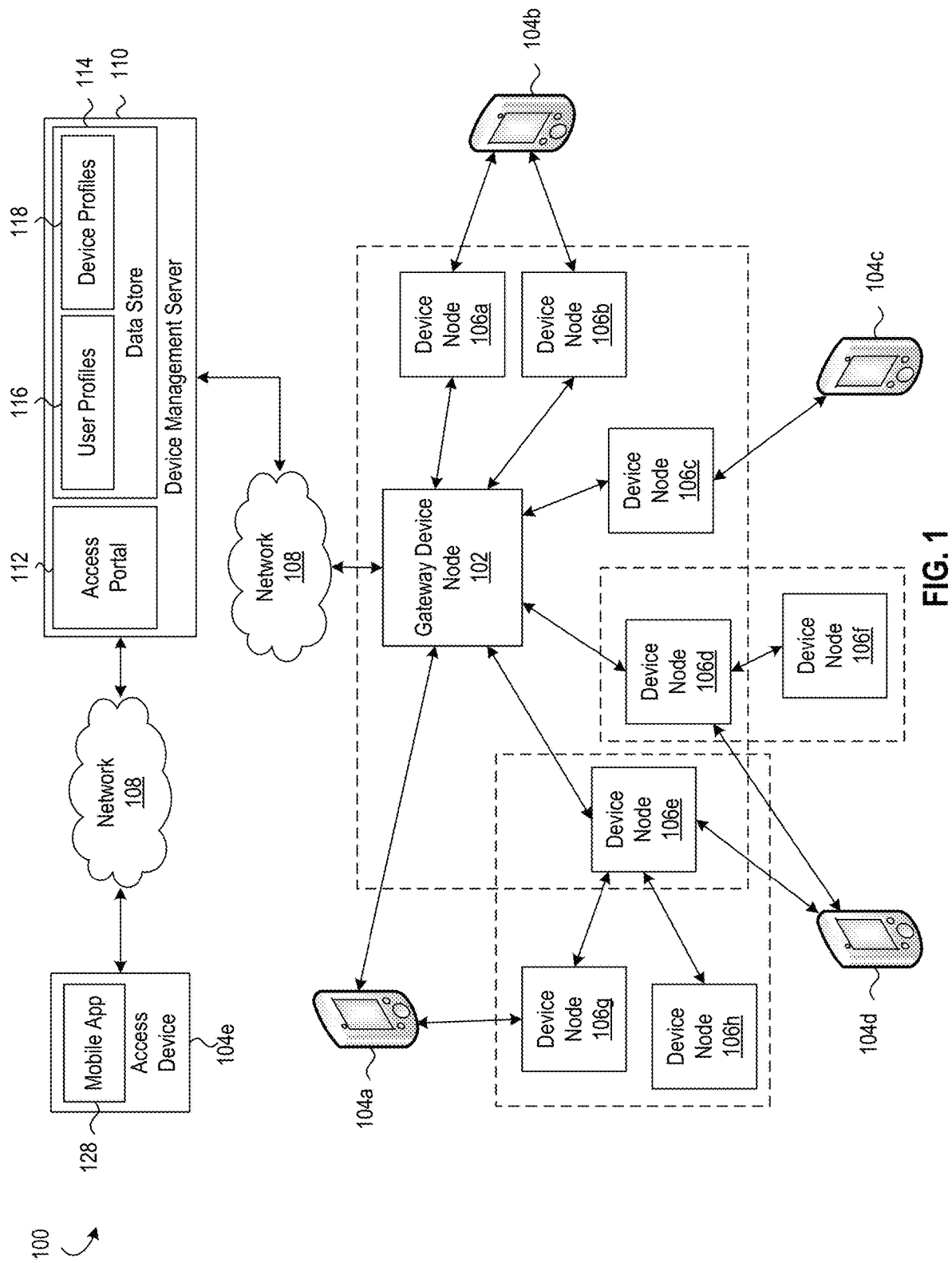
FIG. 1 depicts an example of an implementation of a local network of interconnected devices in accordance with aspects described herein.

The disclosures below provide techniques for updating the operational parameters of a device node in a local network of interconnected devices. As noted above, the techniques described in further detail below may be employed to ensure that a user-operated device is authorized to access a device node of the local network of interconnected devices and should thus be granted access to that device node. As used herein, accessing a device node includes transmitting a message to the device node, receiving a message from the device node, and transmitting a command to the device node. In other words, accessing a device node includes controlling the device node, interacting with the device node, or otherwise communicating with the device node. Operational parameters of a device node include settings, configurations, flags, and other types of information that control the operation of the device node.

For convenience the following terminology is adopted herein. A local network of interconnected devices as used herein refers to at least two devices that are in signal communication with each other using at least one of a short-range wireless communication standard or a low-power wireless communication standard. The local network of interconnected devices may also include additional devices in signal communication with one or more devices of the network and configured to employ other wired and/or wireless communication standards. A device node as used herein refers to one of the devices of a local network of interconnected devices. A gateway device node as used herein refers to a device of a local network of interconnected devices that is configured for communicating via a wide area network (WAN)—such as the Internet and/or a cellular network—and for communicating with another one of the device nodes of the network. The gateway device node may also function as the hub of the local network of interconnected devices. The gateway device node may also be referred to as a bridge device node in view of the functionality it provides to bridge the local network and a WAN.

The device nodes of the network may be categorized based on their physical proximity to a gateway device node of the network. A zero-level device node as used herein refers to a device node that is located within the wireless range of the gateway device node, i.e., capable of receiving wireless communications transmitted from the gateway device node and/or capable of transmitting wireless communications that will be received at the gateway device node. A first-level device node as used herein refers to a device node that is located outside the wireless range of a gateway node but is located within the wireless range of a zero-level device node. A second-level device node as used herein refers to a device node that is located outside of the wireless range of a gateway device node and the wireless range of a zero-level device node but is located within the wireless range of a first-level device node. Zero-level device nodes are thus in direct signal communication with a gateway device node and may exchange point-to-point wireless communications. First-level device nodes and second-level device nodes are thus in indirect signal communication with a gateway device node, and communications may be routed to first-level device nodes and second-level device nodes via other device nodes of the network.

The device nodes of a local network of interconnected devices may also be deployed in a master/slave configuration. A master device node as used herein refers to a device node that issues commands to another device node. A slave device node as used herein refers to a device node that receives commands from a master device node. A relay device node as used herein refers to a device node that routes a communication between two other device nodes. Although the network of interconnected devices is referred to as a local network of interconnected devices, a device node that is located remotely relative to another device node of the network may communicate with that device node via a WAN (such as the Internet) as described in further detail below.

The device nodes of the local network of interconnected devices are configured to utilize one or more of the following communication standards: wired LAN communication standards; wireless LAN communication standards; cellular communication standards; short-range wireless communication standards; and low-power wireless communication standards. Examples of wired LAN standards include the IEEE 802.3 family of Ethernet standards. Examples of wireless LAN standards include the IEEE 802.11 family of wireless LAN standards commonly known as "Wi-Fi." Examples of cellular communication standards include any of the 2G, 3G, or 4G generation of cellular communication standards. Examples of short-range communication standards include the IEEE 802.15 family of wireless communication standards which include implementations commonly known as Bluetooth Classic developed by the Bluetooth Special Interest Group (SIG), ZigBee developed by the ZigBee Alliance, and any of the near-field communication (NFC) standards developed by the NFC Forum. Short-range wireless communication standards may permit maximum wireless ranges of about 1 meter (m) to about 100 m (i.e., about 3.3 feet (ft) to about 330 ft) depending on transmission power. Examples of low-power wireless communication standards include Bluetooth low energy (also known as Bluetooth LE, BLE, and Bluetooth Smart) also developed by the Bluetooth SIG and include ANT developed by Dynastream Innovations Inc. Accordingly low-power wireless communication standards include those that exhibit a peak power consumption of about 10 milliamps (mA) to about 30 mA when employed to transmit and/or receive wireless communications.

One or more device nodes of the local network of interconnected devices may also be referred to as a low-power device. As used herein, low-power devices include those that, when active and consuming at least some power, are configured to toggle between a sleep mode and an awake mode where the device consumes significantly less power while in the sleep mode relative to the power consumed while in the awake mode. In some example implementations, the power consumed by an example low-power device during a sleep mode may differ from the power consumed during an awake mode by an order of magnitude—e.g., the device may consume power on a scale of microamps (μA) during a sleep mode and consume power on a scale of milliamps during an awake mode. In one particular example, a low-power device may receive a power supply voltage of 3 volts (V) and exhibit the following power consumption characteristics. While in a sleep mode, this example low-power device may exhibit a power consumption of about 0.6 μA with no retention of data in volatile memory, a power consumption of about 1.2 μA with 8 kilobytes (kB) of data retention in volatile memory, and a power consumption of about 1.8 μA with 16 kB of data retention in volatile memory. While in an awake mode, this example low-power device may exhibit a power consumption of about 2.6 μA during periods of relatively low activity at a controller, a power consumption of about 10.5 mA during transmission of a wireless signal at about 0 dBm, and a peak power consumption of about 13 mA during reception of a wireless signal. It will be appreciated that the values provided above are provided by way of example only and that other low-power devices may exhibit different power consumption profiles.

A dual-mode device node as used herein refers to a device node configured to wirelessly communicate using at least two low-power wireless communication standards (e.g., both ANT and BLE). A multi-mode node as used herein refers to a device node configured to wirelessly communicate using at least two low-power wireless communication standards (e.g., both ANT and BLE) as well as at least one other wired or wireless communication standard (e.g., a short-range wireless communication standard, a cellular communication standard, a wired LAN communication standard, and/or a wireless LAN communication standard). It will be recognized that the local network of interconnected devices may, in some circumstances, be or include a personal area network (PAN) where the device nodes of the network are logically associated with an individual user and communicate over relatively short distances. A local area network of interconnected devices may thus include multiple PANs each respectively associated with a particular user, e.g., each the individual of a household.

An access device as used herein refers to a user-operated device that is configured to interact with other device nodes in the local network of interconnected devices. Examples of access devices include computing devices (e.g., mobile cellular telephones, palmtop computing devices, tablet computing devices, laptop computing devices, desktop computing devices, video game machines, network-enabled televisions, and the like), miniature remotes (e.g., keyfobs), and other types of devices having at least one communication interface configured for communicating with one or more types of devices nodes of a local network of interconnected devices either directly or indirectly via one or more device nodes and/or via local and/or remote computing devices. As described in further detail below, access devices include instructions that, when executed at the access device, cause the access device to wirelessly communicate with device nodes of a local network of interconnected devices. Some of the instructions cause the access device to accept input from the user such that the access device initiates communications to device nodes responsive to and based on that input. Other instructions cause the access device to provide output to the user responsive to and based on communications received from devices nodes. The instructions may reside in non-volatile memory at the access device, and those instructions may or may not be updatable. In some examples, those instructions may be implemented as an application installed at the access device.

As described in further detail below device nodes may pair and bond with each other when in direct signal communication. As used herein, pairing refers to the process of discovering a device, exchanging device information, and exchanging communications during a temporary communication session. As also used herein, bonding refers to the process of exchanging long-term keys between paired devices such that those devices may subsequently pair automatically when those devices are within their respective wireless ranges. In some examples, bonding may include a standard Bluetooth bonding procedure. In other examples, bonding may include the procedures used to establish communication sessions as described in commonly-owned U.S. Pat. No. 9,407,624, which is incorporated herein by reference.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Networks of Interconnected Devices

Referring now to FIG. 1, an example of an implementation of a local network of interconnected devices 100 ("network") is shown. As seen in FIG. 1, the network 100 includes multiple device nodes of different types in signal communication with each other. In particular, the network 100, in this example, includes a gateway device node 102 ("gateway"), access devices 104a, 104b, 104c, 104d, and 104e (generally access device 104 and collectively access devices 104a-e), and device nodes 106a, 106b, 106c, 106d, 106e, 106f, 106g, and 106h (generally device node 106 and collectively device nodes 106a-h). It will be appreciated that the network 100 depicted in FIG. 1 is illustrated by way of example only and that other implementations of a local network of interconnected devices may include more or fewer devices nodes in signal communication with each other.

As also seen in FIG. 1, the gateway 102 and the access device 104e are each in signal communication, via a network 108, with a device management server 110. The network 108 may be a WAN that includes one or more wired and/or wireless networks such as, e.g., the Internet, a cellular network, a satellite network, and the like. In this way, the access device 104e may communicate with the gateway 102 or any of the other device nodes 106 of the network 100 even though that access device is located remotely relative to the other device nodes.

The device management server 110, in this example, includes an access portal 112 and a data store 114 storing user profiles 116 and device profiles 118. The access portal 112 is configured to facilitate the communications between the access device 104e and the gateway 102. Accordingly, in some example implementations, the access portal 112 may be implemented as a web server that utilizes the HyperText Transport Protocol (HTTP) to communicate with the access device 104e and the gateway 102. In particular, the access portal 112 may receive HTTP requests from the access device 104e and gateway 102 and transmit HTTP responses to the access device 104e and gateway 102. In addition, the access portal 112 may be configured to push communications to the access device 104e and the gateway 102. In some example implementations, the access portal 112 may utilize HyperText Transport Protocol Secure (HTTPS) to encrypt and thus secure the communications. The content (i.e., the payload) of the communications may be formatted according to an Extensible Markup Language (XML) format and/or a JavaScript Object Notation (JSON) format. Content may thus be submitted to the access portal 112, for example, in HTTP POST requests. The content of the communications may also be encrypted using a key associated with the device node receiving the communications. Encrypting communications between device nodes of a local network of interconnected devices is discussed in further detail below. The access portal 112 of the device management server 110 may thus act as a relay for communications between the gateway 102 and device nodes 106 and the remotely-located access device 104e. Various configurations and arrangements may be employed to implement the device management server 110. In some example implementations, the access portal 112 and data store 114 may reside at the same machine while in other example implementations an access portal and data store may reside at different machines that are in signal communication with each other. In some example implementations, the device management server 110 may utilize a user device interface (UDI) and a physical device interface (PDI) to respectively serve XML and JSON content. The UDI, for example, may serve XML content over HTTPS to access devices (e.g., access device 104e). The PDI, for example, may serve JSON content (e.g., encrypted JSON content) to device nodes (e.g., gateway device node 102 and device nodes 106).

The user profiles 116 stored at the data store 114 include individual user profiles for users each having established respective local networks of interconnected devices. Individual user profiles 116, in this example, include data corresponding to a unique identifier for the user (e.g., a user account number, a username, an email address, a phone number, and the like). Individual user profiles 116 may also include data corresponding to login credentials (e.g., a username and a salted and hashed password). The device profiles 118, in this example, include two types of device profiles: (i) device profiles corresponding to the gateway 102 and device nodes 106 of the network 100, and (ii) device profiles corresponding to the access devices 104 that communicate with the device nodes 106. Individual device profiles 118 for device nodes include data corresponding to a unique identifier for the device node (e.g., a serial number), a device type, a default or user-specified description of the device, a security token associated with the device, one or more keys associated with the device (e.g., public and private digital signature keys), and a status of the device. In some example implementations, device nodes may be associated with multiple serial numbers, e.g., a 16 byte serial number and a 4 byte serial number. The serial numbers, security token, and keys may be generated at the time of manufacture and associated with the device throughout its lifetime. The keys may be, e.g., 128-bit keys. A device node may utilize one or more of its keys with one or more encryption algorithms to encrypt at least a portion of the communications transmitted and with one or more decryption algorithms to decrypt at least a portion of the communications received.

Individual device profiles 118 for device nodes also include data identifying the user profile 116 the device node is associated with (e.g., the user account number, username, email address, and the like). Individual device profiles for the access devices 104 may likewise include data corresponding to a unique identifier for the access device (e.g., a serial number, a device address such as a media access control (MAC) address, and the like), a type of the access device (e.g., mobile cellular telephone, tablet computing device, keyfob, and the like), a manufacturer of the access device, a model number of the access device, an operating system of the access device, and the like. The device profiles for gateways may also include a command queue corresponding to a list of commands that have been transmitted to the device management server from access devices located remotely relative to the local network of interconnected devices. As described in further detail below, the device management server transmits to a gateway the commands included in its corresponding command queue. Individual user profiles 116 may also include or be otherwise associated with invitations to other access devices authorized to communicate with, and thus access, the device nodes 106 of the network 100. Invitations will be discussed in further detail below. In addition, the data included in the user profiles 116 and device profiles 118 discussed above is described by way of example only. Accordingly other implementations of the user and device profiles may include additional or alternative data corresponding to additional or alternative aspects or characteristics of the users, device nodes, and access devices.

The data store 114 may include a database (not shown) that implements a data model for storing the data of the user profiles 116 and the device profiles 118. The database may store the data of the user profiles 116 and the device profiles 118 according to that data model. The database may thus include one or more tables respectively corresponding to users and device nodes, e.g., a USER table, a DEVICE table, and an INVITATION table. The rows of the USER table may correspond to records of the user profiles 116, and the rows of the DEVICE table may correspond to records of the device profiles 118. The rows of the INVITATION table may correspond to records of invitations that have been generated for access devices. The columns of the tables may correspond to the particular data elements stored for the user profiles 116 and the device profiles 118. The database may associate records of individual user profiles 116 with records of device profiles 118 through the use of primary and/or foreign keys included in those records. The database may associate records of individual user profiles 116 with invitations in a similar fashion. Through the associations of their corresponding database records, users and user accounts are thus associated with access devices 104 and devices nodes 106 of the network 100. The device management server 110 may thus also include a database management system (DBMS, not shown) that manages the storage and retrieval of the data of the user profiles 116 and the device profiles 118, e.g., creating new records, querying for existing records, and deleting records from the database. The access portal 112 and the gateway 102, in this example, are in signal communication with the data store 114 and may store and retrieve the data of the user profiles 116 and the device profiles 118, e.g., via the DBMS.

The access portal 112, in this example, is also configured to authenticate the access device 104e based on login credentials provided by to the access device by the user and subsequently transmitted to the access portal. Upon successful authentication, the access portal 112 may provide a dashboard interface ("dashboard") at which the user may access and manage the devices of the network 100 that are associated with the user account of the user. The access device 104e may present the dashboard to the user and accept input from the user. Through the dashboard, the user may, for example, check the status of device nodes 106 in the network 100, issue commands to device nodes, toggle activation of the device nodes, add device nodes to the network, remove device nodes from the network, view audit logs associated with the device nodes, view access devices currently authorized to communicate with the device nodes, view invitations to other access devices, resend invitations to access devices, create new invitations, and engage in other activities associated with the device nodes that will be appreciated with the benefit of this disclosure. These activities will be discussed further below.

The access devices 104, in this example, are configured with instructions for receiving input from a user and providing output to a user and for communicating with the device management server 110, gateway 102, and device nodes 106. The instructions may be implemented for example, as a device monitoring and control mobile application ("mobile application") installed at an access device such as the mobile application 128 installed at the access device 104e. As discussed in further detail below, the mobile application 128 provides functionality for viewing the status of the device nodes, pairing and/or bonding with those device nodes, and issuing commands to those device nodes.

As noted above, some device nodes in a local network of interconnected devices may be in direct signal communication with each other while other devices nodes may be in indirect signal communication via a relay device node. Whether a device node is in direct or indirect signal communication with another device node depends on the wireless ranges of those device nodes. The network 100 shown by way of example in FIG. 1 illustrates device nodes that are both in direct and indirect signal communication with each other based on their wireless range. The dashed lines surrounding the gateway 102 and device nodes 106 in FIG. 1 demarcate the device nodes that are within their respective wireless range and thus in direct signal communication with each other. In particular, area 120 indicates that the gateway 102 and device nodes 106a-e are within wireless range; area 122 indicates that device nodes 106a-b are within wireless range; area 124 indicates that device nodes 106d and 106f are within wireless range; and area 126 indicates that device nodes 106e and 106g-h are within wireless range. FIG. 1 also illustrates respective access devices 104a-d that are within the wireless range of various device nodes 106 of the network. In particular, access device 104a is in direct signal communication with the gateway 102 and device node 106g, access device 104b is in direct signal communication with device nodes 106a-b, access device 104c is in direct signal communication with device node 106c, and access device 104d is in direct signal communication with device nodes 106d-e. As discussed in further detail below, the communications among the access devices 104, gateway 102, and devices nodes 106 may be secured using various security techniques.

The device nodes 106 may include different classes of device nodes, e.g., dual-mode device nodes and multi-mode device nodes. The device nodes 106 may also include different types of devices nodes within those classes of device nodes. Dual-mode and multi-mode device nodes may include the following types of device nodes: (i) sensor-type device nodes that include sensors for measuring various parameters associated with the surrounding environment such as for example, acoustic and optical sensors, chemical sensors (e.g., oxygen, carbon dioxide, carbon monoxide, smoke, etc.), electric and magnetic sensors, electromagnetic radiation sensors, temperature sensors, force and pressure sensors, moisture and fluid flow sensors, air and air flow sensors, velocity and acceleration sensors, position and displacement sensors, proximity and motion sensors, and the like; and (ii) activation-type device nodes that include actuators, solenoids, and/or output devices that are operable in response to receipt of commands such as, for example, locks for structures (e.g., doors, gates, and the like) and for containers (e.g., safes, drawers, cabinets, and the like), optical output devices (e.g., lights, display devices, and the like), audio output devices (e.g., speakers, alarms, and the like), automatic garage door openers, automatic gate openers, and the like. In some example implementations, device nodes may be configured to include audio data and/or image data in the communications transmitted to other device nodes, a gateway, the device management server, or an access device.

Figure 2:
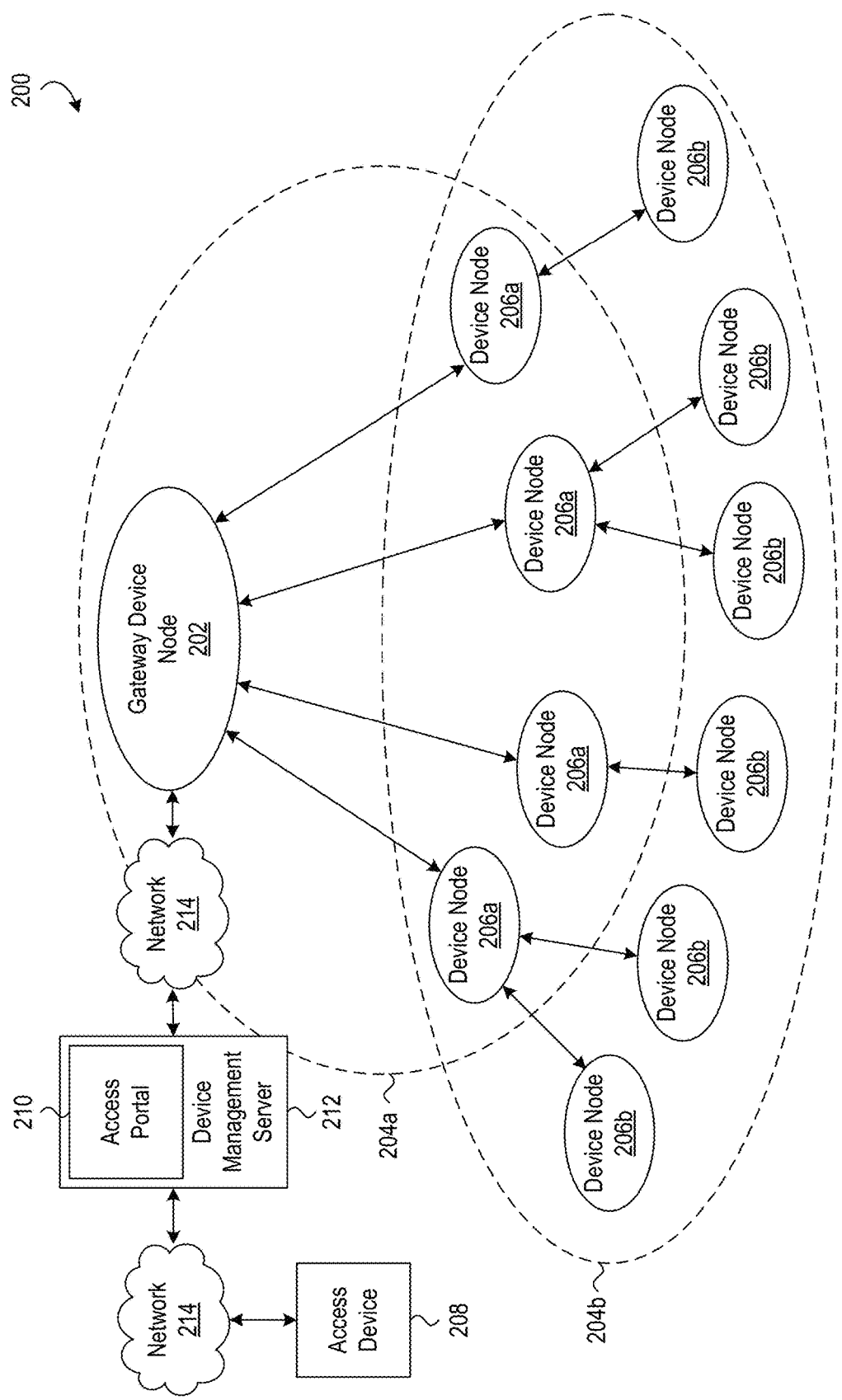
FIG. 2 depicts another example of an implementation of a local network of interconnected devices in accordance with aspects described herein.

Referring now to FIG. 2, another local network of interconnected devices 200 ("network") is shown. In FIG. 2, the hierarchical arrangement of the network 200 is depicted with respect to a gateway device node 202, a set 204a of zero-level device nodes 206a, and a set 204b of first-level device nodes 206b (collectively device nodes 206). In FIG. 2, the zero-level device nodes 206a and the gateway 202 are within their respective wireless ranges and thus in direct signal communication with each other. The first-level device nodes 206b are outside the wireless range of the gateway 202, but within the wireless range of one of the zero-level device nodes 206a. The first-level device nodes 206b are thus in direct signal communication with the zero-level device nodes 206a and in indirect signal communication with the gateway 202 via the zero-level device nodes. Second-level device nodes (not shown) may be in direct signal communication with the first-level device nodes 206b and in indirect signal communication with the gateway 202 via the first-level device nodes and the zero-level device nodes 206a in a similar fashion. Third-level device nodes, fourth-level device nodes, and so on, may be connected to upper-level device nodes in a similar fashion. Accordingly the number of levels of the local network of interconnected devices is not intended to be limited to the two example levels shown in FIG. 2. As also seen in FIG. 2 and noted above, the gateway 202 (and thus the device nodes 206) may be in signal communication with an access device 208 via an access portal 210 of a device management server 212 across a network 214, e.g., a WAN such as the Internet and/or a cellular network. In some example implementations, the gateway 202 may be in signal communication with an access device 208 via a PDI of the device management server 212.

In this hierarchical arrangement, the gateway 202 and device nodes 206 may interact in a master-slave configuration. In other words, one device may be designated as a master device node, and another device may be configured as a slave device node relative to that master device node. The master device node may issue commands to the slave device node, and the slave device node may respond according to those commands. With respect to the network 200 shown by way of example in FIG. 2, the gateway 202 may be configured as a master device node, and at least one of the zero-level device nodes 206a may be configured as a slave device node to the gateway. Additionally or alternatively, one of the zero-level device nodes 206a may be configured as a master device node, and one of the first-level device nodes 206b may be configured as a slave device node relative to that zero-level device node. Commands transmitted from a master device node to a slave device node include a command to provide the current status of the slave device node (e.g., whether a lock-type device node is in a locked or unlocked state), a command to provide a measurement value measured by the slave device node (e.g., the current reading measured by a sensor-type device node), and a command to perform some action at the slave device node (e.g., perform a lock or unlock operation at a lock-type device node). Other examples of various command types and specific commands will be appreciated with the benefit of this disclosure.

By equipping the device nodes with multiple types of communication interfaces and configuring the device nodes to utilize multiple wireless communication standards, users advantageously derive the benefit of multiple types of network topologies. As an example, various short-range wireless communication standards may be suitable for establishing master/slave configurations in point-to-point networks, star networks, and tree networks but might not be suitable for establishing mesh networks. Various low-power wireless communication standards, however, may be suitable for establishing mesh networks. Accordingly, device nodes configured to utilize both short-range and low-power wireless communication standards may thus establish networks that include a combination of network topologies, e.g., networks exhibiting point-to-point, star, tree, and mesh topologies. The device nodes may advantageously utilize each of the respective features provided by the different technologies, e.g., the master/slave features available with the point-to-point, star, and tree network topologies as well as the relay features and multiple communication pathways available with the mesh network topology.

One or more of the device nodes of the local network of interconnected devices may receive updates with respect to its stored instructions. A device node may receive an update wirelessly or via a wired connection. As an example, a gateway device node may receive an update from the device management server via its wired connection to a wide area network (e.g., the Internet). The device management server may also send an update for one of the device nodes to the gateway device node, and the gateway device node may wirelessly transmit the update to the specified device node (i.e., an over-the-air update). If necessary, the update for the specified device node may be routed from the gateway device node via one or more other device nodes. A device node may also receive an update from an access device in signal communication with the device node. In some circumstances, the device management server may provide the gateway device node with an update to be applied at each device node of the local network of interconnected devices, and the gateway device node may broadcast the update to each of the device nodes.

Device Nodes

Figure 3:
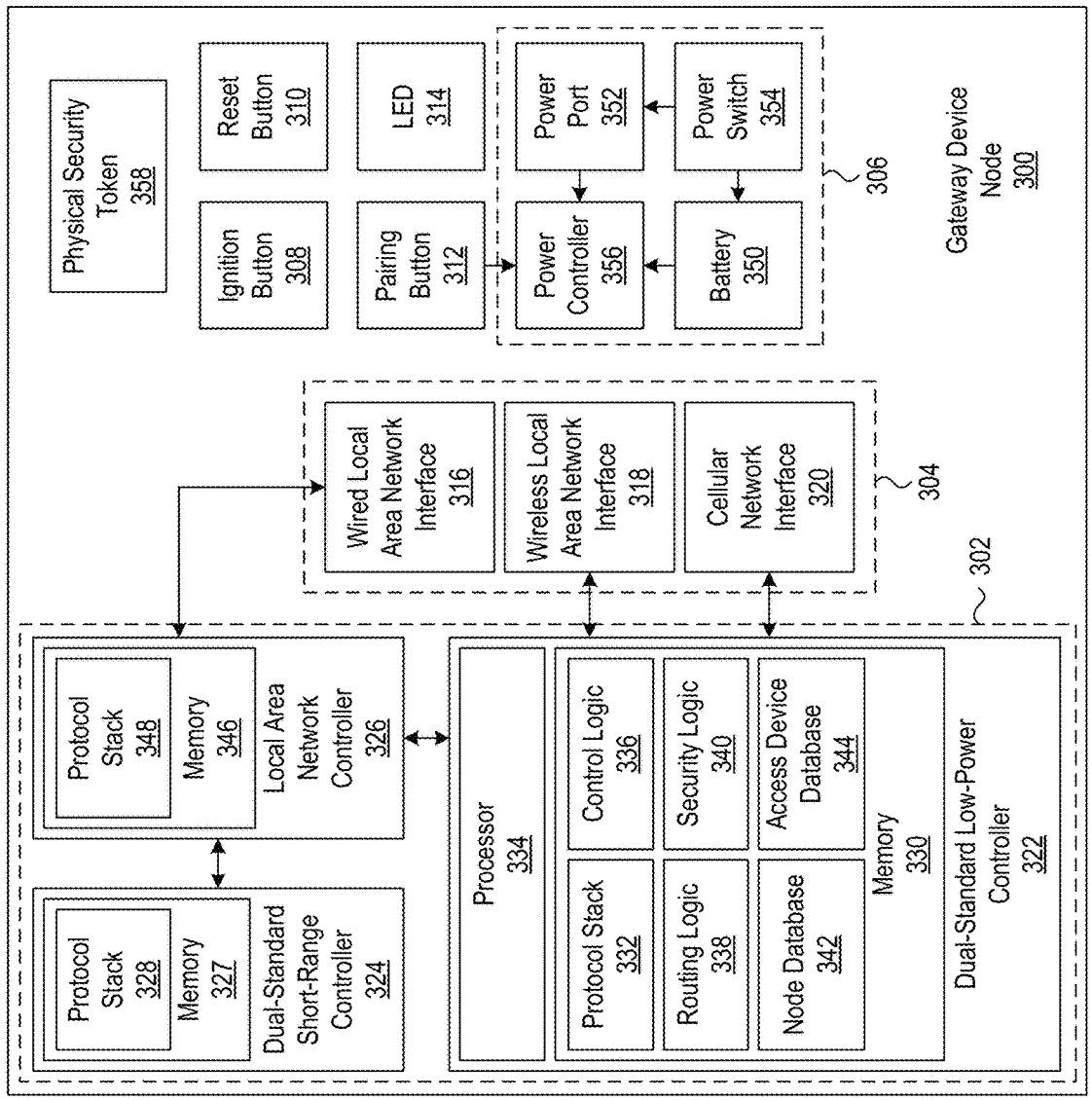
FIG. 3 depicts an example of an implementation of a gateway device node in accordance with aspects described herein.
Figure 5:
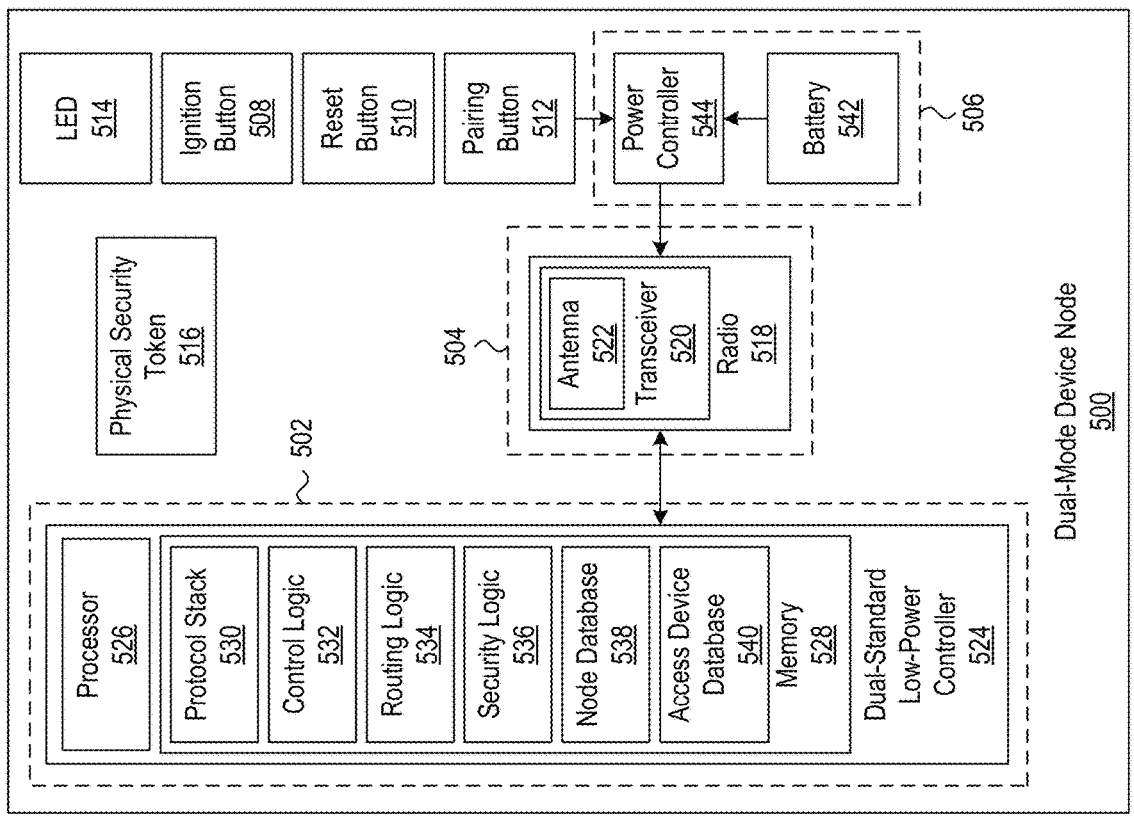
FIG. 5 depicts an example of an implementation of a dual-mode device node in accordance with aspects described herein.
Figure 4:
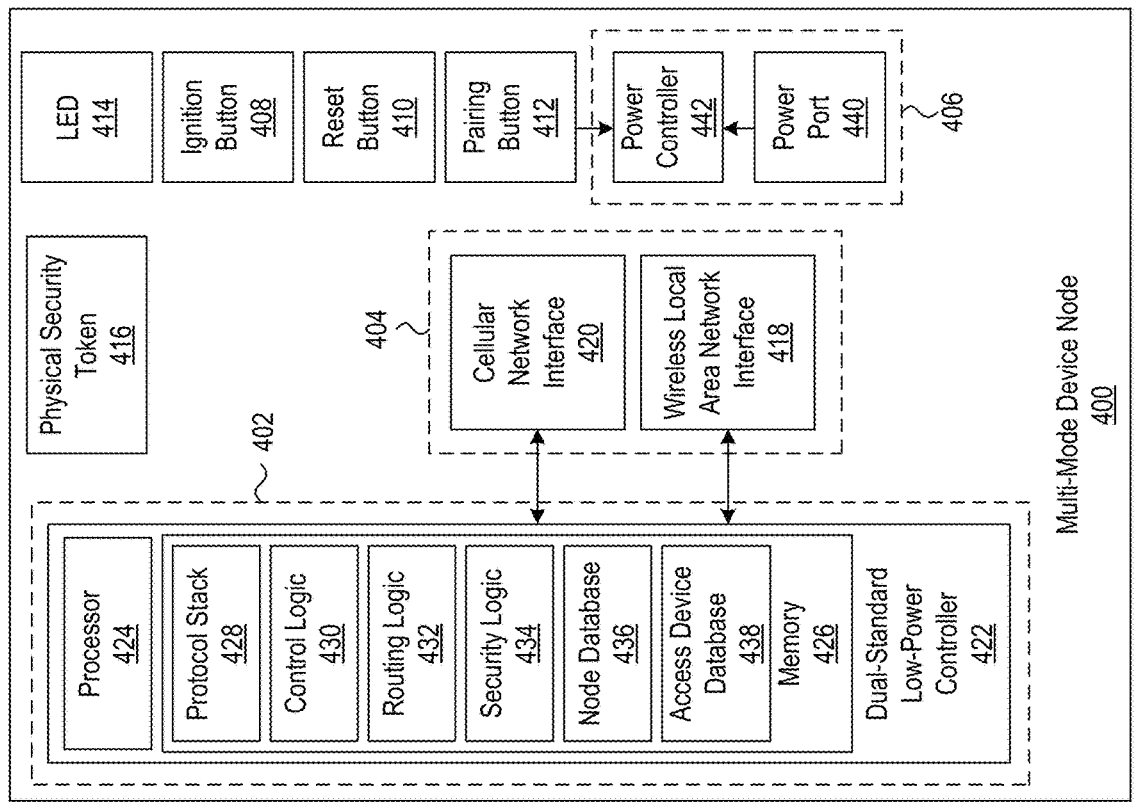
FIG. 4 depicts an example of an implementation of a multi-mode device node in accordance with aspects described herein.

Referring now to FIGS. 3-5 example types of device nodes are illustrated. In FIG. 3, an example of an implementation of a gateway device node is shown. In FIG. 4, an example of an implementation of a multi-mode device node is shown. In FIG. 5, an example of an implementation of a dual-mode device node is shown. The device nodes discussed above with reference to FIGS. 1-2 may respectively correspond to the example device nodes illustrated in FIGS. 3-5 and discussed in further detail below. A local network of interconnected devices may include one or more of each type of device node. In one example implementation of a local network of interconnected devices, a gateway node may serve as the hub of multiple dual-mode device nodes and multi-mode device nodes that are part of the network at various layers. FIGS. 3-5 include lines illustrating the signal paths between various components of the device nodes. It should be appreciated, however, that, for the sake of clarity, not every signal path between the components of the device nodes have been illustrated in the figures.

Device nodes—including gateway device nodes, dual-mode device nodes, and multi-mode device nodes—may each be assigned a serial number, a security token, and a set of keys (e.g., three keys) upon manufacture. This unique identification information is employed to recognize, authenticate, and authorize device nodes when added to a local network of interconnected devices and when communicating with other device nodes of the network and the device management server. The keys are also used to encrypt and decrypt portions of the communications exchanged between access devices and other device nodes. In particular, the device nodes may utilize the keys to encrypt and decrypt session identifiers of the communication sessions established between access devices and other device nodes as well as the content of those communications. Authorized access devices may also be provided with the keys associated with a device node and also utilize those keys to encrypt and decrypt portions of the communications exchanged with the device node.

With reference to FIG. 3, an example of an implementation of a gateway device node 300 ("gateway") is shown. The gateway 300, in this example, includes a control module 302, a communication module 304, a power module 306. The gateway 300, in this example, also includes multiple physical user interface elements including an ignition button 308, a reset button 310, a pairing button 312, and a light emitting diode (LED) 314. In other examples, a gateway device node may omit buttons 308-312 and may instead include only a single factory reset button used to restore the factory settings of the gateway device node. In some examples, a gateway device node may omit physical buttons entirely.

The communication module 304 of the gateway 300 includes multiple communication interfaces. In particular, the communication module 304, in this example, includes a wired LAN interface 316, a wireless LAN interface 318, and a cellular network interface 320. The gateway 300 may thus exchange wired and wireless communications with access devices and device nodes of the local network of interconnected devices via one or more of the wired LAN interface 316, the wireless LAN interface 318, and the cellular network interface 320. Although not shown in FIG. 3 for the sake of clarity, the communication module 304 of the gateway 300 may also include one or more radios with corresponding transmitters, receivers, and/or transceivers having one or more antennas to receive and/or transmit wireless communications. Such radios may include radios configured to operate at one or more frequencies suitable for wireless LAN communications such as those frequencies in the ISM band (e.g., 2.4 GHz radios, 5 GHz radios, 60 GHz radios) as well as radios configured to operate at one or more frequencies suitable for cellular communications such as the frequency bands specified by various cellular network standards (e.g., the 1G, 2G, 3G, and 4G families of cellular network standards). In addition, the communication module 304 of the gateway 300 may also include a physical communication port (e.g., an Ethernet port) configured to communicate via the wired LAN interface 316 (e.g., using one or more of the IEEE 802.3 family of Ethernet standards). The wireless LAN interface 318 may likewise be configured to communicate using one or more of the IEEE 802.11 family of wireless LAN standards. The wired LAN interface 316 and the wireless LAN interface 318 thus facilitate communications at the gateway 300 via IP-based networks including LANs and/or WANs (e.g., the Internet). The cellular network interface 320 likewise facilitates the communications to and from the gateway 300 via a cellular network. The cellular network interface 320 may thus include a cellular modem. Cellular modems suitable for use with the cellular network interface 320 include those available from Gemalto M2M GmbH of Munich, Germany such as the cellular machine-to-machine modules having model numbers PLS8, PXS8, PCS3, PVS8, PHS8, PGS8, PDS5, PDS6, PDS8, and the like. The various communication interfaces of the communication module 304 of the gateway 300 advantageously allow access devices that are located remotely relative to the local network of interconnected devices to communicate with the device nodes of the network for monitoring and control purposes.

The control module 302 of the gateway 300 includes multiple controllers for handling and responding to the communications received at and transmitted from the gateway 300. In particular, the control module 302 of the gateway 300, in this example, includes a dual-standard low-power controller 322 ("low-power controller"), a dual-standard short-range controller 324 ("short-range controller"), and a local area network controller 326 ("LAN controller"). As seen in FIG. 3, the LAN controller 326, in this example, is in signal communication with the wired LAN interface 316, the low-power controller 322, and the short-range controller 324. The low-power controller 322, in this example, is also in signal communication with the wireless LAN interface 318 and the cellular network interface 320. The low-power controller 322, wireless LAN interface 318, and cellular network interface 320 may be in respective signal communication with one or more radios (not shown) of the communication module 304.

The short-range controller 324, in this example, is configured to selectively utilize multiple short-range wireless communication standards to wirelessly communicate with access devices and device nodes of the local network of interconnected devices. In some example implementations, the short range controller 324 may be configured to wirelessly communicate using both the Bluetooth Classic and the BLE short-range wireless communication standards. In this way, the gateway 300 may wirelessly communicate with access devices and device nodes that are also configured to wirelessly communicate using the Bluetooth Classic and/or BLE short-range wireless communication standards. In this regard, the short-range controller 324 includes memory 327 storing instructions corresponding to a protocol stack 328 that is configured to handle and process multiple types of short-range wireless communications received at the gateway 300 (e.g., Bluetooth Classic communications and BLE communications) from the access devices or device nodes of the local network of interconnected devices. The protocol stack 328 may be any protocol stack suitable for use with a local network of interconnected devices including, for example, those protocol stacks designed for embedded systems (e.g., the Qualcomm® Bluetopia™ protocol stack available from Qualcomm Atheros, Inc. of San Jose, Calif.).

The low-power controller 322, in this example, is configured to selectively utilize multiple low-power wireless communication standards to wirelessly communicate with access devices and device nodes of the local network of interconnected devices. In some example implementations, the low-power controller 322 may be configured to utilize both the BLE and the ANT low-power wireless communication standards. In this way, the gateway 300 may wirelessly communicate with access devices and device nodes that are also configured to wirelessly communicate using the BLE and/or ANT low-power wireless communication standards. In this regard, the low-power controller 322 likewise includes memory 330 storing instructions corresponding to a protocol stack 332 that is configured to handle and process multiple types of low-power wireless communications received at the gateway 300 (e.g., BLE communications and ANT communications) from the access devices or device nodes of the local network of interconnected devices.

As seen in FIG. 3, the low-power controller 322 is in signal communication with the wired LAN interface 316 (via the LAN controller 326), the wireless LAN interface 318, and the cellular network interface 320. In this way, the gateway 300 may advantageously route communications received via any of these interfaces to device nodes of the local network of interconnected devices, the access devices, and the device management server. The cellular network interface 320 may employ an AT command structure and/or a machine-to-machine command structure for communicating with the low-power controller 322. The wired LAN interface 316 and the wireless LAN interface 318 may likewise employ a serial command structure for communicating with the low-power controller 322. As an example, the wired LAN interface 316 may communicate with the low-power controller 322 via the LAN controller 326 using universal asynchronous receiver/transmitter (UART) communications.

The low-power controller 322 may be a system-on-chip (SoC). Accordingly the low-power controller 322 may include, among other components, a processor 334 and logic stored at the memory 330 for controlling operation of the low-power controller. The low-power controller 322 may thus include other components common to a SoC (e.g., timing sources, peripherals, digital signal interfaces, analog signal interfaces, power management components, and the like) which have been omitted from FIG. 3 for the sake of clarity. Low-power controllers suitable for use as the low-power controller 322 include those available from Nordic Semiconductor of Oslo, Norway such as the Multiprotocol ANT™/Bluetooth® low energy System on Chip having model number nRF51422 as well as those in the nRF52 Series SoC. In addition, a suitable protocol stack for use as the protocol stack 332 may also be available from Nordic Semiconductor of Oslo, Norway such as the Concurrent ANT™ and Bluetooth® Low Energy SoftDevice having model number S310 nRF51422 as well as those in the SoftDevice family of Nordic Semiconductor. Additional and alternative low-power controllers and protocol stacks may be selectively employed.

The low-power controller 322, in this example, is also configured with instructions for communicating with access devices and device nodes in the local network of interconnected devices. As seen in FIG. 3, the memory 330 of the low-power controller 322 stores instructions corresponding to control 1 For example, the control logic 336 may implement one or more of the procedures used to establish a communication session as described in commonly-owned U.S. Pat. No. 9,407,624. 336 addiogic 336, routing logic 338, and security logic 340 for controlling operational aspects of the gateway 300. As also seen in FIG. 3, the memory 330 of the low-power controller 322 additionally includes a node database 342 for storing records corresponding to the device nodes of the local network of interconnected devices and an access device database 344 for storing records corresponding to the access devices that are authorized to communicate with those device nodes. The records of the node database 342 thus corresponds to a list of the device nodes of the local network of interconnected devices, and the records of the access device database 344 thus corresponds to a list of access devices that are authorized to access the device nodes of the network.

The control logic 336 of the low-power controller 322 corresponds to instructions that handle various operational aspects of the gateway 300. In particular, the control logic 336, in this example, handles the initialization of the gateway 300 upon startup including the configuration of various operating parameters such as, e.g., the operating frequency for the gateway, the initial security mode for the gateway, and the like. The control logic 336 also initiates the periodic transmissions (e.g., every 500 milliseconds) from the gateway 300 announcing its presence to any devices that are within wireless range of the gateway. In addition, the control logic 336 maintains the list of device nodes of the network by creating new records at the node database 342 when new device nodes are added to the network and deleting records from the node database when device nodes are removed from the network. The control logic 336 additionally handles the pairing and bonding procedures performed with access devices. For example, the control logic 336 may implement one or more of the procedures used to establish a communication session as described in commonly-owned U.S. Pat. No. 9,407,624. Furthermore the control logic 336 issues commands to the device nodes of the network (e.g., operations to perform) and polls the device nodes for status updates. Moreover the control logic 336, in this example, also sets a security mode of the gateway 300 in response to receipt of user input indicating a user-selected security mode. The control logic 336 additionally issues, to device nodes of the network, commands that instruct those device nodes to employ a user-selected security mode. Additional operational aspects associated with the gateway that the control logic 336 may handle will be appreciated with the benefit of this disclosure.

The routing logic 338 of the low-power controller 322 corresponds to instructions that route communications between device nodes of the local network of interconnected devices, between the device management server and those device nodes, and between the access devices and those device nodes. The routing logic 338 thus ports communications received at the gateway 300 via the low-power wireless communication standards to the other communication standards the gateway 300 is configured to use, e.g., the wired LAN and wireless LAN communication standards, the short-range communication standards, and the cellular communication standards. The routing logic 338 likewise ports communications received via these other communication standards to the low-power communication standards utilized by the low-power controller 322. The routing logic 338 may include routing tables that are utilized to route communications through the local network of interconnected devices. Those routing tables may be updated responsive to changes at the local network of interconnected devices, e.g., as device nodes are added to and removed from the network. The gateway 300 may also be configured to measure various metrics associated with the transmission environment surrounding the gateway (e.g., signal-to-noise ratio, parity check losses, and the like) and make routing decisions based on those metrics, e.g., determining whether to route a communication to a device node using one or more of a low-power wireless communication standard, a short-range wireless communication standard, a wireless LAN communication standard, and/or a wired LAN communication standard. As an example, the metrics measured by the gateway 300 may favor routing a communication via one device node over another device node depending on the environmental metric measurements. The routing logic may also make routing decisions based on the respective security modes set for the device nodes along potential routing pathways. As an example, the routing logic may not select a potential routing pathway where the security mode for a device node along that pathway is relatively less secure than the security mode set for the target device node. In other words, when routing a communication to a target device node, the routing logic may select a routing pathway where the respective security modes of each device node along that pathway is at least as secure as the security mode set for the target device node.

The security logic 340 of the low-power controller 322 corresponds to the instructions that control the manner in which the gateway 300 secures the communications (if at all) between access devices, other device nodes of the network, and the device management server. The security logic 340, in this example, includes respective sets of instructions that each correspond to a particular security mode. Each respective security mode may be configured to employ various techniques for securing the communications or, in some circumstances, permitting unsecured communications. Accordingly, example security modes included in the security logic 340 may include one or more security modes that require communications to be encrypted as well as one or more security modes that permit communications to be unencrypted. In addition, the security modes requiring encryption may each specify a particular encryption method to employ when encrypting the communications, e.g., security modes respectively requiring relatively more or less complex encryption methods. The security logic 340 stored at the memory of the low-power controller 322 may include one or more keys associated with the gateway device node 300 used to encrypt the content (i.e., the payload) and communications transmitted to the access devices as well as decrypt the content and communications received from access devices, the device management server, and other device nodes of the network. The security modes that do not require encryption may include security modes that require authentication of a security token in order to communicate as well as security modes that permit communication without authenticating a security token. The gateway 300 may be configured with a default security mode. As noted above, however, the security mode of the gateway 300 may be changed in response to receipt of user input identifying a security mode selected for the gateway by the user. User-selectable security modes will be discussed in further detail below.

The node database 342, in this example, stores records of the device nodes of the local network of interconnected devices. A device node record includes a set of information associated with one of the device nodes of the network. A device node record may include, for example, the serial number of the device node and a security token associated with the device node. A device node record may also include the local network address assigned to the device node upon joining the network, the serial number of its parent device node, the local network address assigned to its parent device node, and the layer number of the parent device node in the network. A device node record may also include identifications of the class of device node as well as the type of the device node—e.g., whether the device node is dual-mode or multi-mode device node, whether the device node is a sensor-type device node or an activation-type device node, and the particular type of sensor or activatable device. In addition, a device node record may include an indication of the security mode set for the device node. Furthermore a device node record may include an indication of whether the device node is powered via an internal power source (e.g., a battery) or via an external power source (e.g., an AC or DC power supply). In some example implementations, the device class, device type, and power profile may be encoded in the serial number of the device node. A device node record may also include one or more of the keys associated with the device node and used by the low-power controller 322 to encrypt and decrypt content and communications transmitted to and received from the device node corresponding to that device node record.

The access device database 344, in this example, stores records of the access devices that are authorized to exchange communications with device nodes of the local network of interconnected devices. The low-power controller 322 may create a new record for an access device when the gateway 300 successfully bonds with that access device during a pairing and bonding procedure. The gateway device node 300 may bond with an access device by employing the procedures used to establish a communication session as described in commonly-owned U.S. Pat. No. 9,407,624. In this way, the low-power controller 322 may engage in subsequent low-power communication sessions with that access device without repeating the pairing and bonding process. An access device record includes a set of information associated with an access device including information used to secure communications between the gateway 300 and the access device. An access device record may include, for example, a unique identifier for the access device (e.g., a MAC address) and one or more keys exchanged between the gateway 300 and the access device during a bonding procedure (e.g., LTK, EDIV, and Rand keys). The keys exchanged may include, e.g., a key to secure communications exchanged between the gateway 300 and the access device during a communication session as well as a key associated with the access device that is used to verify digital signatures received from the access device and sign content transmitted to the access device. An access device record may also include an invitation code generated for an invited access device that has been authorized to communicate with the gateway 300. The short-range controller 324 may also include an access device database similar to the access device database 344 of the low-power controller 322. In this way, the short-range controller 324 may likewise store records of access devices that have bonded with the gateway 300 which the short-range controller may utilize for subsequent short-range communication sessions with the access device.

The LAN controller 326 handles and processes the communications received at and transmitted from the gateway 300 via the wired LAN interface 316. Such communications may be received from and transmitted to the device management server via an IP-based WAN such as the Internet. Accordingly, the LAN controller 326, in this example, likewise includes memory 346 storing instructions corresponding to a protocol stack 348 that is configured to handle and process IP-based communications received at the gateway 300 from the device management server. Protocol stacks suitable for use as the protocol stack 348 of the LAN controller 326 include those designed for use in embedded systems (e.g., the open source "lightweight IP" protocol stack, the open source "micro IP" protocol stack, and the like). As seen in FIG. 3, the LAN controller 326 is in signal communication with both the short-range controller 324 and the low-power controller 322. Accordingly the LAN controller 326, in this example, is configured to port communications between the wired LAN interface and the short-range controller 324, between the wired LAN interface and the low-power controller, and between the short-range controller and the low-power controller. In addition, some implementations of the gateway device node may store the device node database and access device database in local memory rather than the memory of a low-power controller. The low-power controller, in these example implementations, may thus be in signal communication with the local memory of the gateway device node to access the device node database and access node database.

In some example implementations, the short-range controller 324 and/or the LAN controller 326 may also be SoCs and thus include their own respective processors, timing devices, control logic, and the like. In other example implementations, the gateway 300 itself may include, e.g., one or more processors, timing devices, and memory storing instructions corresponding to control logic (also omitted from FIG. 3 for the sake of clarity) which the short-range controller 324 and/or the LAN controller 326 may utilize for operation.

The power module 306 of the gateway 300 includes components for supplying power to the gateway 300 and configuring how power is supplied to the gateway. The power module 306, in this example, includes both an internal power source, a battery 350, and a power port 352 for connecting to an external power source (e.g., an AC or DC power source). The battery 350 may be a battery (e.g., an alkaline battery, a lithium-ion battery, a nickel-cadmium battery, lead-acid battery, and the like) and may be recharged when an external power source supplies power to the gateway 300 via the power port 352. The power module 306 also includes a power switch 354 for controlling whether the gateway 300 is powered by the battery 350 or an external power source via the power port 352. A user may thus toggle the switch to selectively control whether the internal or external power source provides power to the gateway 300. In some examples, a gateway device may not include a battery and may instead be only mains powered. Additionally or alternatively, the gateway 300 may be receive power via Power over Ethernet (PoE), an energy harvesting device that harvests ambient energy (e.g., energy from sources such as solar, thermal, wind, fluid flow, kinetic movements, mechanical strain, electromagnetic radiation, and the like), or a wireless power transfer (WPT) using electric, magnetic, or electromagnetic fields.

The power module 306, in this example, also includes a power controller 356 connected to the battery 350 and the power port 352. The power controller 356 may, in turn, be connected to one or more of the radios (not shown) of the gateway 300 to control the power supplied to the radios and thus control the transmission power of the wireless communications transmitted from the gateway. The power controller 356 may thus control the wireless range of the gateway 300 by controlling the transmission power of its radios. Furthermore the power controller 356 may automatically adjust the power supplied to a radio based on whether the gateway 300 is currently powered by an internal power source (e.g., the battery 350) or an external power source. If currently powered externally, the power controller 356 may provide full power to a radio of the gateway in order to maximize the wireless range of the gateway (e.g., up to about 100 m). In some example implementations, full power to a radio of the gateway 300 may result in transmission power between about 16 decibels (dB) and about 23 dB. If currently powered internally, however, the power controller 356 may provide less than full power to a radio of the gateway in order to reduce or minimize power consumption at the gateway at the expense of a wireless range that is less than the maximized wireless range.

As seen in FIG. 3, the gateway 300, in this example, also includes a pairing button 312 connected to the power controller 356. A user may press the pairing button 312 to temporarily reduce the transmission power of the gateway 300 such that its wireless range is minimized (e.g., up to about 1 m). As described in further detail below, the user may press the pairing button to reduce the wireless range of the gateway 300 as a security measure when pairing and bonding an access device with the gateway. In this way, the user may ensure that no other devices can receive the communications exchanged between the gateway and the access device during the pairing and bonding process. In some example implementations, the pairing button 312 may be configured such that the transmission power of the gateway 300 is reduced until the pairing button is again pressed by the user. In other example implementations, the pairing button 312 may be configured to initiate a temporary reduction of the transmission power of the gateway for a predetermined time period (e.g., about 1-2 minutes) such that, at the end of that time period, the transmission power of the gateway returns to the previous transmission power.

The ignition button 308 of the gateway 300, in this example, triggers an initialization procedure at the gateway 300. In some example implementations, the control logic 336 of the low-power controller 322 is configured to carry out the initialization procedure. The initialization procedure may include, for example, setting various operating parameters (e.g., selecting an operating frequency channel), confirming signal communication with the device management server via the wired LAN interface 316, confirming signal communication with a cellular network via the cellular network interface 320, clearing any existing records from the node database 342 and the access device database 344, and transmitting announcements indicating the gateway is present and available to accept requests to join the local network of interconnected devices. Forming the local network of interconnected devices is discussed in further detail below. The reset button 310 of the gateway 300, in this example, triggers re-initialization of the gateway 300. The LED 314 of the gateway 300, in this example, may indicate one or more statuses of the gateway 300, e.g., via the on/off status of the LED or via its blink pattern. One or more respective blink patterns of the LED may indicate, for example, that an error has occurred during the initialization procedure (e.g., the gateway could not connect to the device management server or the cellular network), that an access device has successfully paired and bonded with the gateway, that a device node has been added to or removed from the local network of interconnected devices, and the like. If the ignition button 308 is omitted from a gateway device node, then that gateway device node may perform the initialization procedure described above automatically upon power-up.

Finally, the gateway 300, in this example, includes a physical security token 358 that is affixed to the gateway 300 and accessible to a user. As an example, the physical security token 358 may be affixed to a housing of the gateway 300. The physical security token 358 may be a barcode (e.g., a QR code) that encodes information associated with the gateway 300. The encoded information may include, e.g., the serial numbers of the gateway 300, the device class and device type, the default security level for the gateway, and the security token associated with the gateway. This information may also be encrypted, and the barcode may encode the encrypted information. The information may be encrypted using an encryption algorithm suitable for embedded systems such as, e.g., the tiny-AES128-C encryption algorithm. An access device may scan the barcode (e.g., using an optical input device such as a camera) to obtain the encoded information. The access device may also store a key (e.g., as part of the mobile application), and use the key to decrypt the encrypted information obtained from the barcode.

Referring now to FIG. 4, an example of an implementation of a multi-mode device node 400 is shown. Similar to the gateway device node 300, the multi-mode device node 400, in this example, includes a control module 402, a communication module 404, and a power module 406. The multi-mode device node 400, in this example, also includes an ignition button 408, a reset button 410, a pairing button 412, and an LED 414. The multi-mode device node 400 may also include a physical security token 416 affixed to the device node, e.g., to a housing of the device node. In other examples, a multi-mode device node may omit buttons 408-412 and may instead include only a single factory reset button used to restore the factory settings of the multi-mode device node. In some examples, a multi-mode device node may omit physical buttons entirely.

The ignition button 408, the reset button 410, and the pairing button 412 may be the same as or at least similar to the ignition button 308, the reset button 310, and the pairing button 321 respectively discussed above with reference to FIG. 3. In some example implementations, the multi-mode device node 400 may be configured to enter into a sleep mode if it is unable to connect to a local network of interconnected devices after a user presses the ignition button 408. Engaging the reset button 410 may cause the multi-mode device node to awake from the sleep mode and reattempt the process of locating a network to connect to. The physical security token 416 may also be the same as or at least similar to the physical security token 358 discussed above with reference to FIG. 3 and encode the same type of information associated with the multi-mode device node 400. If the ignition button 408 is omitted from a multi-mode device node, then that multi-mode device node may perform an initialization procedure automatically upon power-up.

The communication module 404 of the multi-mode device node 400, in this example, likewise includes multiple communication interfaces. In particular, the communication module 404, in this example, includes a wireless LAN interface 418 and a cellular network interface 420. The multi-mode device node 400 may thus exchange wireless communications with a access devices, a gateway device node, and other device nodes of the local network of interconnected devices via one or more of the wireless LAN interface 418 and the cellular network interface 420. The wireless LAN interface 418 may be the same as or at least similar to the wireless LAN interface 318 discussed above with reference to FIG. 3, and the cellular network interface 420 may be the same as or at least similar to the cellular network interface 320 also discussed above with reference to FIG. 3. In addition, although again not shown in FIG. 4 for the sake of clarity, the communication module 404 of the multi-mode device node 400 may also likewise include one or more radios with corresponding transmitters, receivers, and/or transceivers having one or more antennas to receive and/or transmit those wireless communications. The radios of the multi-mode device node 400 may likewise be the same as or at least similar to the radios of the gateway device node 300 discussed above with reference to FIG. 3.

The control module 402 of the multi-mode device node 400, in this example, includes a single controller 422 for handling and responding to the wireless communications received at and transmitted from the multi-mode device node. The controller 422, in this example, is also a dual-standard low-power controller ("low-power controller") configured to selectively utilize multiple low-power wireless communication standards to wirelessly communicate with access devices, a gateway device node, the device management server, and other device nodes of the local network of interconnected devices. In some example implementations, the low-power controller 422 may be configured to utilize both the BLE and ANT low-power wireless communication standards. As seen in FIG. 4, the low-power controller 422 is in signal communication with both the wireless LAN interface 418 and the cellular network interface 420. The low-power controller 422 may also be in signal communication with one or more of the radios of the multi-mode device node 400. In this way, the multi-mode device node 400 may likewise route communications received via any of these interfaces to access devices, the gateway device node, the device management server, and other device nodes of the network.

The low-power controller 422 may be the same as or at least similar to the low-power controller 322 discussed above with reference to FIG. 3, e.g., an SoC. In this regard, the low-power controller 422 likewise includes a processor 424 and memory 426 storing instructions that are executed by the processor for controlling operational aspects associated with the multi-mode device node 400. The instructions stored at the memory 426 of the low-power controller 422, in this example, include instructions corresponding to a protocol stack 428 that is configured to handle and process multiple types of low-power wireless communications received at and transmitted from the multi-mode device node 400 (e.g., BLE communications and ANT communications) from access devices, a gateway device node, the device management server, or other device nodes of the local network of interconnected devices. The protocol stack 428 of the low-power controller 422 may thus be the same as or at least similar to the protocol stack 332 of the low-power controller 322 discussed above with reference to FIG. 3.

In some example implementations, a device node may also include a signal processor situated between the low-power controller and the radio. The signal processor may intercept the output sent from the low-power controller to the radio and likewise intercept input received at the radio to be sent to the low-power controller. Processing the input and output may include filtering and/or amplifying the signals. As an example, it may be desirable to amplify the signals output from the low-power controller to increase the wireless transmission range of the device node. The extent to which those signals may be amplified might be limited, however, due to distortion that occurs when the signals are amplified beyond a certain power level, e.g., −5 dBm. In order to further amplify the signals and avoid distortion, the signal processor may intercept the signals output by the low-power controller and filter and amplify those signals before passing the signals to the radio for transmission. Suitable signal processors include the 2.4 GHz ZigBee®/802.15.4 Front-End Module having model number SE2431L available from Skyworks Solutions, Inc. of Woburn, Mass.

The memory 426 of the low-power controller 422, in this example, also stores instructions corresponding to control logic 430, routing logic 432, and security logic 434 also for controlling operational aspects of the multi-mode device node 400. The routing logic 432 and the security logic 434 may be the same as or at least similar to the routing logic 338 and security logic 340 discussed above with reference to the gateway 300 in FIG. 3. The routing logic 432 may thus also route communications to an access device, a gateway device node, a device management server, or other device nodes of the local network of interconnected devices.

Depending on the device node type of a multi-mode device node, however, the security logic 434 may include instructions corresponding to a subset of the security modes available at a gateway device node. As an example, the security logic of multi-mode device nodes that are configured to secure buildings, structures, and containers (e.g., lock-type device nodes), may include instructions corresponding to security modes that are relatively more secure than other security modes. The security logic of multi-mode device nodes that are not at risk for unauthorized access may include instructions corresponding to both relatively less secure and relatively more secure security modes. Where the multi-mode device node is a sensor-type device node, for example, the risk or costs of unauthorized access may be relatively small. Accordingly, the security logic of one or more sensor-type multi-mode device nodes may include instructions corresponding to one or more relatively less secure security modes. In addition, as noted above, the security logic 434 of the multi-mode device node 400 may be configured to employ a default security mode or a user-selected security mode.

The control logic 430 of the low-power controller 422 may depend on the device node type of the multi-mode device node 400. For activation-type multi-mode device nodes, the control logic 430 may include instructions for receiving and processing commands from a gateway device node, the device management server, or other device nodes of the local network of interconnected devices. For activation-type multi-mode device nodes, commands may include commands to activate a motor, an actuator, solenoid, optical output device or unit, audio output device or unit, and the like. For lock-type multi-mode device nodes, in particular, commands may include commands to toggle a lock status, i.e., commands to lock or unlock. For sensor-type multi-mode device nodes, commands may include commands to, e.g., activate or deactivate one or more sensors, adjust one or more sensor parameters (e.g., sensitivity), take a new measurement, and provide a most recent measurement, the previous x number of measurements, or a measurement obtained at a specified date and/or time or within a specified date range or time period.

The control logic 430 of the low-power controller 422 may also include instructions that are not dependent on the device node type. In particular, the control logic 430 for each type of multi-mode device node may include instructions for initializing the multi-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 430 of the low-power controller 422 may also include instructions for toggling between a sleep mode and an awake mode during which the multi-mode device node 400 transmits announcements at periodic intervals (e.g., every 10-50 ms) for a predetermined time period (e.g., for 30-60 seconds). If the multi-mode device node 400 receives a pairing request while awake— e.g., from an access device or another device node—then the multi-mode device node may pair and communicate with that access device or device node. The control logic 430 may also include instructions that terminate the connection if a communication (e.g., a command request) is not received for a predetermined time period (e.g., 60 seconds). Furthermore the control logic 430 may include instructions to reenter a sleep mode upon termination of a connection and upon failing to receive a pairing request while awake during the predetermined time period.

As also seen in FIG. 4, memory 426 of the low-power controller 422 also stores a device node database 436 and an access device database 438. The access device database 438 may be the same as or at least similar to the access device database 344 discussed above with reference to FIG. 3. In this regard, the access device database 438, in this example, may store records corresponding to the access devices that have paired and bonded with the multi-mode device node 400 and are thus authorized to access the multi-mode device node. The multi-mode device node 400 may bond with an access device by employing the procedures used to establish a communication session as described in commonly-owned U.S. Pat. No. 9,407,624. As noted above, an access node record may also include one or more keys associated with the access device and used by the low-power controller 422 to encrypt and decrypt content and communications transmitted to and received from the access device corresponding to that access device record. An access node record may also store an invitation code for an invited access device that has been authorized to communicate with the multi-mode device node 400.

The device node database 436, in this example, stores records of the next-level device nodes that are connected to the multi-mode device node 400 in the local network of interconnected devices. For a zero-level device node, the device node database 436 may thus store records corresponding to its child device nodes, i.e., the first-level device nodes in signal communication with that zero-level device node as well as the corresponding child device nodes of each of its child device nodes, i.e., the second-level device nodes in signal communication with those first-level device nodes. For a first-level device node, the device node database 436 may likewise store records corresponding to its child device nodes, i.e., the second-level device nodes in signal communication with that first-level device node. Accordingly, a device node record may include: the serial number of the child node and the network address assigned to the child node, the serial number of the parent node and the network address assigned to the parent node, the layer number of the parent node, and a registration status of the child node. The registration status of the child node may indicate whether the child node has been registered with an upper level device node. As an example, the device node record stored at a first-level device node for a second-level device node may indicate whether that second-level device node has been registered with a zero-level device node and/or a gateway device node.

The power module 406 of the multi-mode device node 400, in this example, includes a power port 440 for receiving power from an external power source and a power controller 442 for controlling the power supplied to one or more of the radios (not shown) of the multi-mode device node. As seen in FIG. 4, the power controller 442 is connected to the pairing button 412. Accordingly, like the pairing button 312 discussed above with reference to FIG. 3, the pairing button 412, when pressed by a user, may cause the power controller 442 to reduce the transmission power of the multi-mode device node 400 thus reducing its wireless range. Additionally or alternatively and similar to a gateway device node, a multi-mode device node may receive power via PoE, an energy harvesting device, or WPT.

It will be appreciated that some implementations of multi-mode device nodes may also include an internal power source such as a battery in addition to a power port for receiving power from an external power source. Multi-mode device nodes having both an internal and an external power source may also include a power switch for toggling whether the multi-mode device node is powered internally or externally as described above with reference to FIG. 3. In addition, a multi-mode device node may also include a wired LAN interface and corresponding wired LAN controller similar to those of the gateway device node 300 discussed above. In addition, other implementations of a multi-mode device node may store its node database and access device database in local memory rather than the memory of the low-power controller.

With reference now to FIG. 5, an example of an implementation of a dual-mode device node 500 is shown. Similar to the gateway device node 300 and the multi-mode device node 400, the dual-mode device node 500, in this example, includes a control module 502, a communication module 504, and a power module 506. The dual-mode device node 500, in this example, also includes an ignition button 508, a reset button 510, a pairing button 512, and an LED 514. The dual-mode device node 500 may also include a physical security token 516 affixed to the device node, e.g., to a housing of the device node. In other examples, a dual-mode device node may omit buttons 508-512 and may instead include only a single factory reset button used to restore the factory settings of the dual-mode device node. In some examples, a dual-mode device node may omit physical buttons entirely.

The ignition button 508, the reset button 510, and the pairing button 512 may be the same as or at least similar to, respectively, the ignition button 308, the reset button 310, and the pairing button 321 discussed above with reference to FIG. 3. In some example implementations, the dual-mode device node 500 may be configured to enter into a sleep mode if it is unable to connect to a local network of interconnected devices after a user presses the ignition button 508. Engaging the reset button 510 may cause the dual-mode device node to awake from the sleep mode and reattempt the process of locating a network to connect to. The physical security token 516 may also be the same as or at least similar to the physical security token 358 discussed above with reference to FIG. 3 and encode the same type of information associated with the dual-mode device node 500. If the ignition button 508 is omitted from a dual-mode device node, then that dual-mode device node may perform an initialization procedure automatically upon power-up.

The communication module 504 of the dual-mode device node 500, in this example, includes one communication interface. In particular, the communication module 504, in this example, includes a radio having a transceiver 520 and corresponding antenna 522. The radio 518 may be configured to operate at one or more frequencies within the ISM radio band. Accordingly the radio 518 may be, e.g., a 2.4 GHz and/or 5 GHz radio. Other types of radios and frequency bands suitable for wireless communications may be selectively employed. The radios discussed above with reference to the gateway device node 300 and the multi-mode device node 400 may be the same as or at least similar to the radio 518 of the dual-mode device node 500.

The control module 502 of the dual-mode device node 500, in this example, also includes a single controller 524 for handling and responding to the wireless communications received at and transmitted from the dual-mode device node. The controller 524, in this example, is also a dual-standard low-power controller ("low-power controller") configured to selectively utilize multiple low-power wireless communication standards to wirelessly communicate with access devices, a gateway device node, and other device nodes of the local network of interconnected devices. In some example implementations, the low-power controller 524 is configured to utilize both the BLE and ANT low-power wireless communication standards. As seen in FIG. 5, the low-power controller 524 is in signal communication with the radio 518.

The low-power controller 524 may be the same as or at least similar to the low-power controller 322 discussed above with reference to FIG. 3, e.g., an SoC. In this regard, the low-power controller 524 likewise includes a processor 526 and memory 528 storing instructions that are executed by the processor for controlling operational aspects associated with the dual-mode device node 500. The instructions stored at the memory 528 of the low-power controller 524, in this example, include instructions corresponding to a protocol stack 530 that is configured to handle and process multiple types of low-power wireless communications received at and transmitted from the dual-mode device node 500 (e.g., BLE communications and ANT communications) from access devices, a gateway device node, or other device nodes of the local network of interconnected devices. The protocol stack 530 of the low-power controller 524 may thus be the same as or at least similar to the protocol stack 332 of the low-power controller 322 discussed above with reference to FIG. 3.

The memory 528 of the low-power controller 524, in this example, also stores instructions corresponding to control logic 532, routing logic 534, and security logic 536 for controlling operational aspects of the dual-mode device node 500. The dual-mode device node 500 may bond with an access device by employing the procedures used to establish a communication session as described in commonly-owned U.S. Pat. No. 9,407,624. The routing logic 534 and the security logic 536 may be the same as or at least similar to the routing logic 338 and security logic 340 discussed above with reference to the gateway 300 in FIG. 3. The routing logic 534 may thus also route communications to an access device, a gateway device node, or other device nodes of the local network of interconnected devices.

Like the security logic 434 of the multi-mode device node 400, the security logic 536 may similarly depend on the device node type of a dual-mode device node. The security modes included in the security logic 536 of the low-power controller 524 may thus depend on the risk associated with unauthorized access to the dual-mode device node (e.g., sensor-type device nodes versus lock-type device nodes). Accordingly where relatively less risk is associated with the dual-mode device node 500, the security logic 536 may include instructions corresponding to relatively less secure security modes. Likewise where relatively more risk is associated with the dual-mode device node 500, the security logic 536 may include instructions only corresponding to relatively more secure security modes. The security logic 536 of the low-power controller 524 may also be configured to employ a default security mode or a user-selected security mode.

The control logic 532 of the low-power controller 524 may likewise depend on the device node type of the dual-mode device node 500. Accordingly, the control logic 532 of the low-power controller 524 may be similar to the control logic 430 discussed above, e.g., with respect to activation-type dual-mode device nodes and sensor-type dual-mode device nodes. The control logic 532 of the low-power controller 524 may likewise include instructions that are not dependent on the device node type. In particular, the control logic 532 for each type of dual-mode device node may include instructions for initializing the dual-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 532 of the low-power controller 524 may thus also include instructions for toggling between a sleep mode and an awake mode during which the dual-mode device node 500 transmits announcements at periodic intervals for a predetermined time period. The control logic 532 may thus likewise include instructions to terminate a connection and reenter a sleep mode if a communication is not received within a predetermined time period or reenter a sleep mode if a pairing request is not received in response to an announcement transmitted within a predetermined time period.

The memory 528 of the low-power controller 524 likewise stores a device node database 538 and an access device database 540. The access device database 540 may be the same as or at least similar to the access device databases 344 and 438 discussed above with reference to FIGS. 3-4. In this regard, the access device database 540, in this example, may store records corresponding to the access devices that have paired and bonded with the dual-mode device node 500 and are thus authorized to access the dual-mode device node. As noted above, an access node record may also include one or more keys (e.g., a public key) associated with the access device and used by the low-power controller 524 to encrypt and decrypt content and communications transmitted to and received from the access device corresponding to that access device record as well as an invitation code generated for an invited access device that has been authorized to communicate with the dual-mode device node. The device node database 538 likewise stores records of the next-level device nodes that are connected to the dual-mode device node 500 in the local network of interconnected devices. Accordingly the device node database 538 and its corresponding device node records may be the same as or at least similar to the device node database 436 discussed above with reference to FIG. 4.

The power module 506 of the dual-mode device node 500, in this example, includes an internal power source, in particular, a battery 542 and a power controller 544 for controlling the power supplied to the radio 518. As seen in FIG. 5, the power controller 544 is connected to the pairing button 512. Accordingly, like the pairing button 312 discussed above with reference to FIG. 3, the pairing button 512, when pressed by a user, may cause the power controller 544 to reduce the transmission power of the dual-mode device node 500 thus reducing its wireless range. Additionally or alternatively and similar to a gateway device node and a multi-mode device node, a dual-mode device node may receive power via PoE, an energy harvesting device, or WPT.

It will be appreciated that some implementations of dual-mode device nodes may also include a power port for receiving power from an external power source in addition to a battery. Dual-mode device nodes having both an internal and an external power source may also include a power switch for toggling whether the dual-mode device node is powered internally or externally as described above with reference to FIG. 3. It will also be appreciated that in some implementations of gateway device nodes, multi-mode device nodes, and dual-mode device nodes one or more of the ignition button, the reset button, the pairing button, and the LED may be optional. In addition, other implementations of a dual-mode device node may store the device node database and access device database in local memory rather than in the memory of the low-power controller.

Figure 6A:
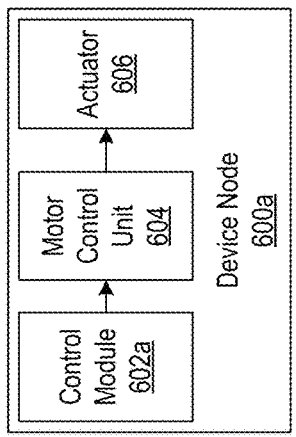
FIG. 6A depicts an example of an implementation of a first type of device node in accordance with aspects described herein.
Figure 6B:
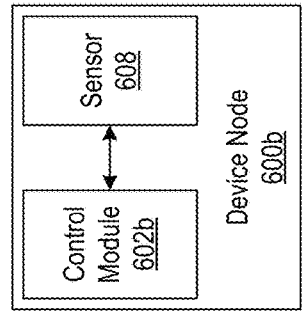
FIG. 6B depicts an example of an implementation of a second type of device node in accordance with aspects described herein.

Referring now to FIGS. 6A-B, respective examples of implementations of two types of device nodes 600a and 600b are shown. In FIG. 6A, an activation-type device node 600a is shown, and in FIG. 6B, a sensor-type device node 600b is shown Like the device nodes discussed above, the activation-type device node 600a and the sensor-type device node 600b each include, respectively, a control module 602a and 602b. The control modules 602a and 602b may be the same as or similar to the control modules discussed above with respect to the gateway device node, the multi-mode device node, and the dual-mode device node. The control module 602a, in this example, is in signal communication with a motor control unit 604 (MCU) which is in turn in connected to an actuator 606. The control module 602a may issue commands to the MCU 604 which in turn triggers activation of the actuator 606 based on those commands. As noted above, activating the actuator 606 may include locking or unlocking a lock, automatically opening or closing a door (e.g., a garage door), and the like. Instead of an MCU 604 and actuator 606, other activation-type device nodes may include optical output devices (e.g., display screens, lights, etc.), audio output devices (e.g., speakers), solenoids, and the like that are connected to the control module 602a. The control module 602b, in this example, is in signal communication with a sensor 608. The control module 602a may thus issue commands to the sensor 608 as discussed above and/or receive data from the sensor (e.g., one or more sensor readings). Various types of sensors that may be employed will be appreciated with the benefit of this disclosure.

Figure 6C:
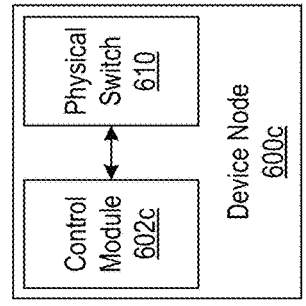
FIG. 6C depicts an example of an implementation of a device node in accordance with aspects described herein.

With reference to FIG. 6C, another example of an implementation of a device node 600c is shown. The device node 600c may correspond to any of the various types of device nodes described above. Like the device nodes 600a-b, the device node 600c includes a control module 602c. The device node 600c, in this example, also includes a physical switch 610 in signal communication with the control module 602c and accessible to a user. A user may engage the physical switch 610 to toggle the active/inactive status of the device node 600c and/or toggle the awake/asleep status of the device node. Accordingly, in some example implementations, the physical switch 610 may be the same as or at least similar to the ignition buttons or reset buttons discussed above. In an inactive state, the device node 600c may be completely powered down. In an active state, the device node may be powered up and either in an asleep state or an awake state. In the asleep state, the device node 600c may only listen for communications transmitted by other device nodes of the local network of interconnected devices. In response to receipt of a communication while in the asleep state, the device node 600c may enter the awake state and take some action, e.g., transmit a response to the communication received. In the awake state, the device node 600c may both listen for communications transmitted by other device nodes as well as transmit communications to other device nodes. The device node 600c may also perform other types of actions when in the awake state, e.g., trigger an actuator or obtain data measured by a sensor. If the device node 600c is in the inactive state, engaging the switch 610 activates the device node. A device node may be configured to enter either the asleep state or the awake state when activated, and the state the device node enters when activated may depend on the type of device. A keyfob, for example, may be configured to immediately enter the asleep state (i.e., power up and listen) when its physical switch is engaged. A door lock, however, may be configured to immediately enter the awake state when its physical switch is engaged and attempt to join the local network of interconnected devices (i.e., power up and transmit). In a similar fashion, a device node may be configured to either listen or immediately transmit when entering the awake state from the asleep state, i.e., wake up and listen versus wake up and transmit. Additional examples will be appreciated with the benefit of this disclosure.

As noted above, the control logic of the respective controllers at the gateway device nodes, multi-mode device nodes, and the dual-mode device nodes include instructions for forming a local network of interconnected devices, securing and routing communications along pathways through and to device nodes of the network, and responding to commands received in those communications. These functional aspects are discussed in further detail below.

Update Packages

As noted above, the device nodes of a local network of interconnected devices store various operational parameters that govern the operation of those device nodes. Examples of such operational parameters include whether local authentication of user-operated devices is enabled, whether the device node is assigned to a bridge, whether the device node is enabled/disabled, and a list of user-operated devices that are currently authorized to access the device node. A device node may utilize the list of authorized user-operated devices during local authentication of a user-operated device that requests access to the device node. Updates to these operational parameters may be needed from time to time. In one example, local authentication may be disabled to enforce stricter security protocols (e.g., remote authentication) with respect to user-operated devices requesting access to the device node. In another example, the list of authorized user-operated devices may be updated to include any new user-operated devices that are authorized to access the device node and to exclude any existing user-operated devices that are no longer authorized to access the device node.

The following example scenario demonstrates how delivering update packages as described below can advantageously help secure access to the device nodes in a local network of interconnected devices. An organization, such as a business, deploys a set of electronic door locks at the exterior doorways of a building to control which individuals are granted access to the building. Authorized individuals interact with the electronic door locks by providing unlock commands via a user-operated device (e.g., a smartphone) in order to gain access to the building. An electronic door lock locally stores a list of those user-operated devices that are authorized to interact with it. Prior to arriving at the building, a guest's smartphone is temporarily granted access to the building via the main entrance by identifying the guest's smartphone in a list of devices authorized to interact with the main entrance's electronic door lock. The updated list of authorized devices is transmitted to guest's smartphone. When the guest's smartphone is within wireless range of the electronic door lock at the main entrance, a mobile application at the smartphone attempts to establish a connection with the electronic door lock in order to gain access to the electronic door lock and issue commands such as an unlock command. Establishing a connection includes an authentication and authorization procedure to confirm the guest's device is authorized to access the main entrance's electronic door lock. Prior to that authentication and authorization procedure, however, the mobile application transmits to the electronic door lock the updated list of authorized devices, which identifies the guest's smartphone as one of those device authorized to interact with the electronic door lock. After receiving the updated list of authorized devices, the electronic door lock updates its locally stored list of authorized devices which, following the update, includes the guest's smartphone as one of the authorized devices. Having updated the list of authorized devices, the electronic door lock successfully authenticates the guest's smartphone and authorizes the smart phone to interact with it. The guest's smartphone may thus transmit an unlock command via the connection established with the electronic door lock. Subsequent to the guest's visit, the smartphone's authorization to interact with the main entrance's electronic door lock is revoked by again updating the list of authorized devices associated with the main entrance's door lock to remove identification of the user's smartphone. When the next user requests to connect to the electronic door lock of the main entrance, the smartphone of that user requests and receives the updated list of authorized devices and transmits that updated list to the electronic door lock. In response, the electronic door lock replaces its stored list of authorized devices with the new list of authorized devices received. Since the new list of authorized devices excludes identification of the guest's smartphone, the guest will not be able to use that smartphone to interact with (e.g., issue an unlock command) to the main entrance's electronic door lock—unless that smartphone is subsequently identified again as an authorized device. The next user may be the guest himself or another user that attempts to interact with the electronic door lock with another user-operated device (e.g., another smartphone). It should thus be recognized that, even after authorization of the guest's smartphone has been revoked, the guest's smartphone may operate as the delivery vector for the updated list of authorized devices transmitted to the electronic door lock. In this regard, an attempt by the guest to interact with the main entrance's electronic door lock after the smartphone's authorization has been revoked (or granted) can trigger the transmission of the updated list of authorized devices to the electronic door lock. It should also be appreciated that the scenario described above is provided only by way of example to illustrate some of the principles associated with the techniques described herein for updating a device in a local network of interconnected devices. As set forth in further detail below, various particular implementations of those techniques may include additional steps not described in the example scenario above.

For device nodes that permit local authentication and authorization, having the most up-to-date list of user-operated devices that are authorized to interact with those device nodes can result in various technical advantages in terms of device security and user-experience. With respect to device security, transmitting updates to a device node's operating parameters (e.g., an updated list of authorized devices) prior to attempting authentication and authorization of a user-operated device, helps to ensure that any user-operated devices no longer authorized to interact with the device node are excluded from the list of authorized devices stored at the device node. With respect to user-experience, only minimal steps may be needed for a newly authorized user-operated device to obtain access to a device node. For example, the user-operated device may only need to obtain a control application configured to carry out the steps (described in further detail below) of obtaining the updates to the device node's operational parameters and transmitting those updates to the device node when attempting to access it. Additional technical advantages will be appreciated upon review of the additional disclosures provided herein.

Figure 7:
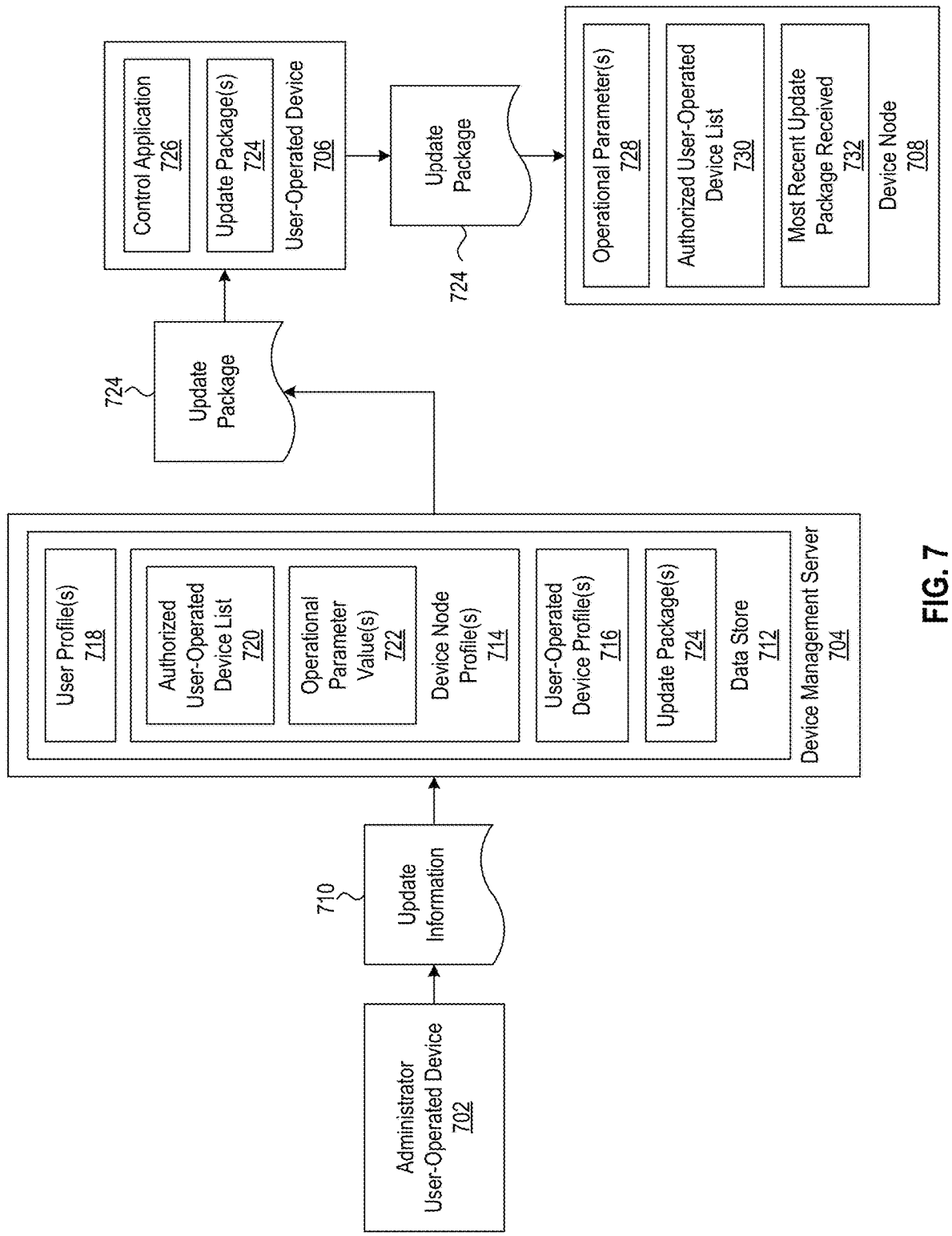
FIG. 7 depicts an example block diagram of updating a device node of a local network of interconnected devices in accordance with aspects described herein.

In FIG. 7, a block diagram depicts, by way of example, updating a device node of a local network of interconnected devices. Here, an administrator user-operated device 702 is in signal communication with a device management server 704 which is in signal communication with a user-operated device 706 which, in turn, is in signal communication with a device node 708 of a local network of interconnected devices. The administrator user-operated device 702 and the user-operated device 706 may be the same as, or at least similar to, the access devices described above with reference to FIGS. 1-2, e.g., access device 104 (FIG. 1) or 208 (FIG. 2). Similarly, the device management server 704 may be the same as, or at least similar to, the device management servers discussed above with reference to FIGS. 1-2, e.g., device management server 110 (FIG. 1) or 212 (FIG. 2) Likewise, the device node 708 may be the same as, or at least similar to, any of the device nodes discussed above with reference to FIGS. 1-5 and 6A-C, e.g., gateway device node 102 (FIG. 1), 202 (FIG. 2), or 300 (FIG. 3); device node 106 (FIG. 1), 206 (FIG. 2), or 600*a-c* (FIGS. 6A-C); multi-mode device node 400 (FIG. 4); or dual-mode device node 500 (FIG. 5).

The administrator user-operated device 702, in this example, is used to provide update information 710 to the device management server 704. The administrator user-operated device 702 is operated by an administrator of the local network of interconnected devices that includes the device node 708. The administrator may be, in one example, the owner of a local network of interconnected devices deployed at the home premises of the owner. The administrator may also be, in another example, an information technology (IT) or security official that manages a local network of interconnected devices deployed at the enterprise premises of a business or other organization. The administrator user-operated device 702 may provide the update information 710 to the device management server 704 using, for example, a desktop application, a mobile application, a command line program, a web portal, a web service, and the like. In this regard, the device management server 704 may provide an application programming interface (API) that may be invoked by the administrator user-operated device 702 in order to transmit the update information 710 to the device management server 704. The device management server 704 itself may additionally or alternatively provide a user interface (e.g., an application, user selection menus, and the like) that receives, from an administrator, user input corresponding to the update information.

The update information 710 includes information pertaining to an operational parameter of the device node 708. Any suitable means for identifying which operational parameter should be updated and the corresponding value for that operational parameter may be selectively employed. For example, one or more HTTP requests may be employed to transmit the update information 710 (in whole or in part) from the administrator user-operated device 702 to the device management server 704. A markup language such as Extensible Markup Language (XML) may also be employed to format a text file that indicates one or more operational parameters of the device node 708 and, for each operational parameter indicated, one or more respective values for that operational parameter. The administrator user-operated device 702 may thus transmit the update information 710 as an XML-formatted text file to the device management server 704 which may be configured to parse the XML-formatted text file and extract the operational parameters indicated as well as their corresponding values. In an implementation that utilizes an API to provide the update information 710, the administrator user-operated device 702 may invoke one or more API function calls to provide the update information 710 to the device management server 704. The API provided by the device management server 704, in this example, may be configured to provide a generic "update" function that accepts at least three input variables—a unique identifier (ID) for the device node, the operational parameter to update, and the value of the operational parameter, e.g., update(device_node_ID, parameter, value). Additionally or alternatively, the API may be configured to provide multiple, specific "update" functions for each updatable operational parameter that accepts at least two input variables—the device node ID and the value of the operational parameter. For example, this API may provide: a function to update whether local authentication is enabled at the device node, e.g., update_local_authn(device_node_ID, true/false); a function to update whether the device node is enabled update_enabled(device_node_ID, true/false); and/or a function to update whether the device node is assigned to a bridge, e.g., update_assigned_bridge(device_node_ID, true/false). The API may also include one or more functions to indicate which user-operated devices are and are not authorized to access the device node. The user-operated devices may likewise be identified using a unique device ID such as a device serial number, a media access control (MAC) address, and the like. In this regard, the API may provide: a function to indicate a user-operated device is newly authorized to access the device node, e.g., add_authz_user_device (device_node_ID, user_device_ID); a function to indicate a user-operated device is no longer authorized to access the device node, remove_authz_user_device(device_node_ID, user_device_ID); and/or a function to replace the list of authorized user-operated devices, e.g., replace_authz_user_devices(device_node_ID, user_device_ID list). Additional and alternative techniques may be selectively employed to transmit the update information 710 from the administrator user-operated device 702 to the device management server 704. For example, the update information 710 may be provided to the device management server 704 via the access portal, UDI, and/or PDI of the device management server.

The administrator user-operated device 702 may also provide at least some of the update information 710 in terms of a user rather than a user operated device. In this regard, the update information 710 may, in some implementations, additionally or alternatively indicate users that are or are not authorized to access the device node 708. Users may likewise be identified by a unique user ID, and the update information 710 may indicate a user is newly authorized to access or no longer authorized to access the device node 708. In an implementation that utilizes an API to provide the update information 710, the API may additionally or alternatively include functions that indicate a user ID in place of a user-operated device ID. As explained in further detail below, the device management server 704 may then utilize the user IDs received in the updated information 710 to identify which corresponding user-operated devices are and are not authorized to access the device node.

As seen in FIG. 7, the device management server 704, in this example, includes a data store 712 that stores profiles for the device nodes of the local network of interconnected devices, the user-operated devices used to access those device nodes, and the users that operated the user-operated devices. In this regard, the data store 712 of the device management server 704, in this example, includes device node profiles 714, user-operated device profiles 716, and user profiles 718. The device node profiles 714 and the user-operated device profiles 716 may be the same as, or at least similar to the device profiles 118 discussed above with reference to FIG. 1 which, as noted above, include two types of device profiles—those corresponding to the device nodes of the local network of interconnected devices and those corresponding to the access devices. Similarly, the user profiles 718 may be the same as, or at least similar to, the user profiles 116 discussed above with reference to FIG. 1. In this regard, a device node profile 714 corresponds to a particular device node of a local network of interconnected devices, a user-operated device profile 716 corresponds to a particular user-operated device with which a user accesses one or more device nodes of the local network of interconnected devices, and a user profile 718 corresponds to a particular user (e.g., an owner or operator) of a user-operated device.

The user-operated device profile 716, in this example, indicates one of the user profiles 718 so as to identify which particular user is associated with that user-operated device. The device management server 704 may thus utilize this relationship between the user-operated device profiles 716 and the user profiles 718 to identify which user-operated device(s) a particular user is associated with, e.g., when the update information 710 indicates the user(s) that are and are not authorized to access a device node.

The device management server 704 may utilize a device node profile 714 to characterize the desired operational state of the corresponding device node at the local network of interconnected devices. Accordingly, the device node profile 714, in this example, includes an authorized user-operated device list 720 indicating one or more of the user-operated device profiles 716 that are authorized to access the corresponding device node. In some example implementations, the device node profile 714 may additionally or alternatively include an authorized user list indicating one or more of the user profiles 718 that are authorized to access the corresponding device node. In addition, the device node profile 714, in this example, also includes one or more operational parameter values 722. As noted above, the operational parameter values 722 may include values indicating, for example, whether the corresponding device node is enabled, whether the corresponding device node is associated with a gateway device, and whether local authentication is enabled at the corresponding device node. By maintaining device node profiles 714 that characterize the desired operational state of the corresponding device nodes, the device management server 704 can generate update packages to be delivered to the device nodes that update their internal operational parameters based on the update packages received.

As also seen in FIG. 7, the data store 712 of the device management server 704, in this example, also stores update packages 724. The device management server 704 may retain at least one update package 724—e.g., the most recent update package—that has been generated for one or more of the device nodes of a local network of interconnected devices. In some example implementations, the device management server 704 may retain a sequence of multiple update packages that have been generated for a device node which may provide a historical record of all changes that have been made to the operational parameters of that device node. The sequence of update packages may be utilized to roll back changes to a corresponding device node. In some example implementations, the first update package in the sequence may indicate an initial configuration of the operational parameters for a corresponding device node, akin to a "factory settings" set of operational parameters. In other example implementations, the device management server 704 may only store the most recent update package 724 (or the previous x number of update packages) for each device node of the local network of interconnected devices. The number of update packages retained by the device management server 704 may be a configurable parameter at the device management server, e.g., a global parameter applicable to all device nodes of all local networks, a network-specific parameter applicable to all device nodes on a particular local network, and/or device-specific parameter applicable to individual device nodes.

Each update package includes information enabling the device node to determine whether one update package is more recent than another update package. Such information may include a timestamp indicating when the update package was generated. Accordingly, a device node may determine that an update package with a later timestamp is the more recent update package when compared to an update package with an earlier timestamp. Additionally or alternatively, such information may include a sequence number indicating the position of the update package in the sequence of update packages generated for that device node. The device node may thus determine that an update package with a higher sequence number is the more recent update package when compared to an update package with a lower sequence number. As described in further detail below, a device node determines whether to keep or discard a received update package based on whether it is more recent than a previously received update package. For convenience, the information indicating the position of a particular update package in a sequence of update packages may be referred to as a sequence identifier.

The device management server 704, in this example, generates an update package 724 in order to propagate, to a device node, desired updates to the operational parameters of a device node of a local network of interconnected devices. The device management server 704 may generate an update package for a device node in response to receiving the update information 710 form the administrator user-operated device 702. Generating the update package 724 includes creating a new update package using at least the update information 710 received from the administrator user-operated device 702. Generating the update package 724 also includes modifying an existing update package using the update information 710 received. When modifying an existing update package, the device management server 704 may also update the sequence identifier (e.g., by inserting a new timestamp or by incrementing a sequence number) in order to indicate the modified update package that is generated is the most recent update package for the corresponding device node.

Having generated the update package 724, the device management server 704 transmits the update package to the user-operated device 706 for storage. The device management server 704 may transmit the update package 724 to the user-operated device via, e.g., a WAN such as the Internet. Details regarding the transmission of the update package 724 to the user-operated device with reference to FIG. 10. After receiving the update package 724, the user-operated device 706 stores the update package in a data store. As seen in FIG. 7, the user-operated device 706, in this example, includes a control application 726, which a user utilizes to control or otherwise interact with the device node 708. As noted above, the user-operated device 706 may be a mobile cellular telephone (e.g., a smartphone). Accordingly, the control application 726 may be, in some examples, a mobile application ("mobile app" or "app") residing on and executed by the user-operated device 706.

The control application 726, in this example, is configured to receive the update package 724 from the device management server 704 and to transmit the update package 724 to the device node 708. As described in further detail below, the control application 726 may be configured to poll the device management server 704 at regular or irregular intervals for any new update packages associated with the device nodes the user-operated device 706 is authorized to access. The control application 726 may additionally or alternatively be configured to poll the device management server 704 for any new update packages in response to a triggering event. Such triggering events include launching, waking, and obtaining focus of the control application 726 at the user-operated device 706. To identify any new update packages that are available when polling the device management server 704, the control application 726 may be configured, for example, to transmit a timestamp indicating that last date and time the control application polled the device management server. The device management server 704 may thus identify any new update packages to be transmitted to the user-operated device 706 based on the timestamp received from the control application 726. Additionally or alternatively, the control application 726 may be configured to transmit, when polling the device management server 704, a list of the most recent update packages received from the device management server. For example, that list may include, for each update package indicated, the device ID of the device node associated with the update package and the sequence identifier of the update package. The device management server 704 may thus similarly identify any new update packages to be transmitted to the user-operated device 706 based on the sequence identifier received.

If the control application 726 determines a new update package is available at the device management server 704, the control application may, in some example implementations, obtain that new update package from the device management server using a request-response protocol. For example, the control application 726 may submit a request (e.g., an HTTP request) to the device management server 704 for the new update package and receive the requested update package in a response (e.g., an HTTP response) from the device management server. In some example implementations, the device management server 704 may be configured to push the update package 724 (e.g., in a push notification) to the control application 726 executing at the user-operated device 706. The update package 724 may correspond to the payload of a communication transmitted from the device management server 704 to the user-operated device 706.

After receiving the update package 724, the user-operated devices 706 stores it in a data store. A user-operated device may be authorized to interact with multiple device nodes of a local network of interconnected devices. The user-operated device 706 may thus store multiple update packages 724—e.g., one update package for each device node the user-operated device is authorized to interact with. In some example implementations, a user-operated device may replace a stored update package it has previously received with a newly received update package. In other implementations, a user-operated device may store a sequence of update packages (e.g., the previous x number of update packages) received for a particular device node.

Having received the update package 724, the user-operated device 706 may wirelessly transmit the update package 724 to the device node 708. For example, the user-operated device 706 may wirelessly transmit the update package 724 to the device node 708 when the two are within wireless range of each other. The range within which the user-operated device 706 and the device node 708 may exchange wireless communications may depend on the wireless communication protocol employed. As described above, a short-range wireless communication protocol such as Bluetooth, ZigBee, or NFC may be employed to directly transmit the update package 724 from the user-operated device 706 to the device node 708. If, however, the user-operated device 706 and the device node 708 are not within wireless range of each other, then transmitting the update package 724 from the user-operated device to the device node 708 may include routing the update package through the local network of interconnected devices, e.g., via another device node of the local network of interconnected devices that is within wireless range of the user-operated device, via a cellular network in signal communication with the device node 708, or via a WAN such as the Internet and a gateway device node of the local network of interconnected devices. The update package 724 may similarly correspond to the payload of a communication transmitted from the user-operated device 706 to the device node 708.

Various events may trigger the transmission of the update package 724 from the user-operated device to the device node 708. In one example, the transmission may be in response to receipt, by the user-operated device 706, of an announcement from the device node 708. In another example, the transmission may be in response to a receipt, by the user-operated device 706, of an acknowledgment transmitted by the device node 708 in response to an announcement by the user-operated device. The transmission may also be triggered in response to receipt, at the control application 726, of user input selecting the device node 708 of a list of device nodes displayed on a user interface of the user-operated device. In some example implementations, the control application 726 may be configured to delete the update package 724 from the data store of the user-operated device after its successful transmission to the device node 708. The user-operated device 706 may transmit the update package 724 to the device node 708 based on (e.g., upon, after, in response to) successfully establishing a connection with the device node but before the device node performs any operation (e.g., locking/unlocking). The user-operated device 706 may transmit the update package 724 to the device node 708 during an active connection with the device node and based on receiving a new update package from the device management server after polling the device management server for any new update packages that are available.

As seen in FIG. 7, the device node 708, in this example, includes one or more operational parameters 728, an authorized user-operated device list 730, and the most recent update package received 732. The operational parameters 728 may include any of those operational parameters discussed herein. The authorized user-operated device list 730 identifies, as described above, those user-operated devices that are authorized to access the device node 708. The most recent update package received 732 may be transmitted to the device node 708 via various communication paths as described herein. One of those communication paths is via a user-operated device that transmits an update package to the device node 708 as described herein. Additional and alternative communications paths are noted above and discussed in further detail below.

After receiving the update package 724, the device node 708 stores it in its data store. Storage of the update package 724 at the device node 708 may be temporary or persistent. As described in further detail below, the device node 708 determines whether the received update package 724 is more recent than a previously received update package. If the new update package 724 received (e.g., update package #80) is not more recent than a previously received update package (e.g., update package #82), then the device node 708 may discard the newly received update package. If, however, the new update package 724 received (e.g., update package #92) is more recent than a previously received update package (e.g., update package #90), then the device node 708 may process the update package to obtain the values for the operational parameters included in the update package and, using the values obtained, apply any necessary changes to the operational parameters stored at the device node. Applying changes to the operational parameters of a device node includes toggling a Boolean value; replacing one numerical, textual, or alphanumerical value with another; and modifying or replacing a list of devices authorized to access the device node.

The device node 708, in some example implementations, may be configured to delete the most recent update package received 732 once the values of the operational parameters included therein have been obtained and applied at the device node 708. In other example implementations, the device node 708 may be configured to persistently store the most recent update package received 732 until it is replaced with a more recent update package as needed. By persistently storing the most recent update package received 732, the device node 708 may determine whether a newly received update package is more recent than the most recent update package received, e.g., based on the respective sequence identifiers for the respective update packages received. Alternatively, to minimize memory usage, the device node 708 may be configured to persistently store only the sequence identifier of the most recent update package received 732 after the device node obtains and applies the values for the operational parameters included in the most recent update package received. In this way, the device node 708 may advantageously determine whether a newly received update package is the most recent update package available using a minimal amount of information.

The device management server 704 may secure the update package 724 using various encryption techniques. As noted above, one or more device-specific encryption keys may be generated for a device node of a local network of interconnected devices for use throughout the lifetime of the device node. The device management server 704 may use one or more of these device-specific encryption keys to encrypt the update package 724 (in whole or in part) prior to transmitting it to the device node 708. For example, the device management server 704 may use one of the device-specific encryption keys generated for the device node 708 to encrypt the entire update package 724. As another example, the device management server 704 may use one of the device-specific encryption keys generated for the device node 708 to encrypt only the one or more of the values of the operational parameters included in the update package 724. In a further example, the device management server 704 may employ dual layers of encryption by using one of the device-specific keys generated for the device node 708 to encrypt one or more of the values of the operational parameters included in the update package 724 and using another one of the device-specific encryption keys to encrypt the entire update package itself. In this way, the security of the update package 724 and the values of the operational parameters included therein may be maintained when the update package is transmitted to a user-operated device for delivery to the device node 708.

The device-specific encryption keys may be implemented using various techniques. In some example implementations, a device-specific encryption may be a symmetric encryption key and thus used to both encrypt and decrypt payloads transmitted to or received from a device node. In other example implementations, the device-specific encryption key may be a public-private key pair in which the device management server 704 uses a device node's public encryption key to encrypt a payload (e.g., the update package 724) to be transmitted to a device node, and that device node uses its corresponding private encryption key to decrypt encrypted payloads upon receipt. In implementations where a symmetric encryption key is employed as the device-specific encryption key, the device management server 704 may store a copy of the device-specific encryption key generated for a device node of a local network of interconnected devices such that the same device-specific encryption key is stored at the device management server and that device node. In implementations where a public-private key pair is employed as the device-specific encryption key, the device management server 704 may only store the public encryption key generated for the device node. Accordingly, in implementations that use a public-private key pair for the device-specific encryption key, the public key of the device-specific encryption key is used (e.g., by the device management server 704) to encrypt a communication, payload, or other data transmitted to a device node. Likewise, in implementations that use a public-private key pair for the device-specific encryption key, the private key of the device-specific encryption key is used (e.g., by the device node 708) to decrypt an encrypted communication, encrypted message, or other encrypted data transmitted to the device node. Using a public-private key pair for the device-specific encryption key may be more secure than using a symmetric key. The device-specific encryption key may be, in some example implementations, a 128-bit encryption key, although it should be appreciated that larger or smaller encryption keys may be selectively employed in other implementations (e.g., 64-bit encryption keys or 256-bit encryption keys).

Figure 8:
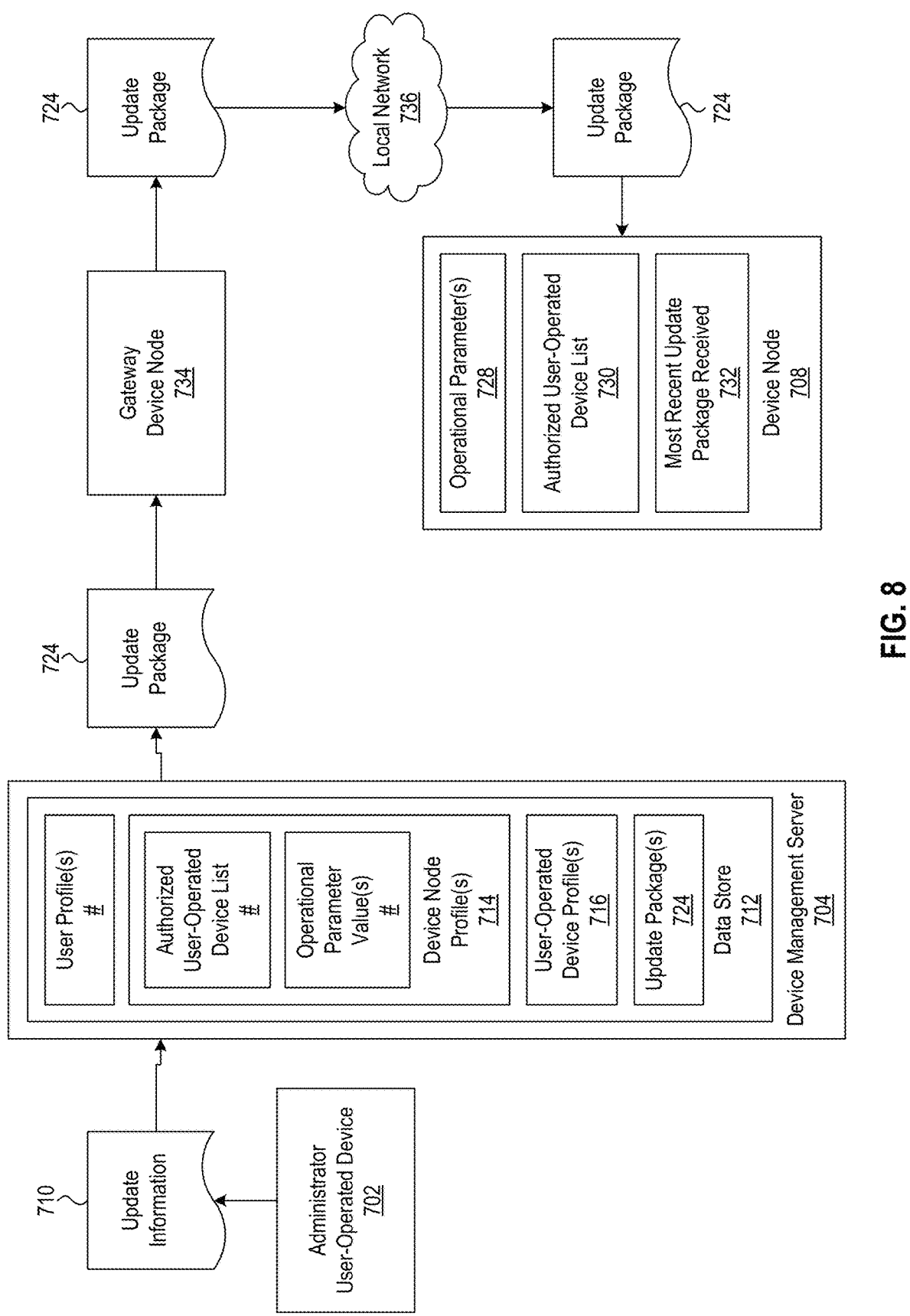
FIG. 8 depicts another example block diagram of updating a device node of a local network of interconnected devices in accordance with aspects described herein.

Turning now to FIG. 8, a block diagram depicts, by way of an additional example, another technique for updating a device node of a local network of interconnected devices. The technique depicted in FIG. 8 may be performed in addition to or as an alternative to delivering the update package 724 to the device node a user-operated device 706 as described above with reference to FIG. 7. As seen in FIG. 8, the device management server 704, in this example, delivers the update package 724 via a gateway device node 734 of the local network 736 of interconnected devices the device node 708 belongs to. Here, the device management server 704 may transmit the update package 724 to the gateway device node 734 over a WAN such as the Internet.

After receiving the update package 724, the gateway device node 734 transmits it to the device node 708. As noted above, the gateway device node 734 may be in direct or indirect signal communication with the device node 708. If in direct signal communication, the gateway device node 734 may transmit the update package 724 to the device node 708 using, e.g., a short-range wireless communication standard or a low-power wireless communication. If in indirect signal communication, the gateway device node 734 may route the update package to the device node 708 through the local network of interconnected devices using, e.g., a wireless mesh networking protocol. After receiving the update package 724, the device node, as described above, evaluates whether that update package is more recent than the most recent update package received 732 by the device node. If so, the device node 708 updates one or more of its operational parameters 728 based on the values of the operational parameters indicated in the update package 724.

It should be appreciated that the block diagrams respectively illustrated in FIGS. 7-8 may not illustrate all of the steps associated with various implementations of the techniques for updating a device node of a local network of interconnected devices. Additional steps associated with particular implementations are described in further detail below. It should be appreciated that the additional steps described herein may be selectively performed according to the needs and preferences of a particular implementation.

Figure 9A:
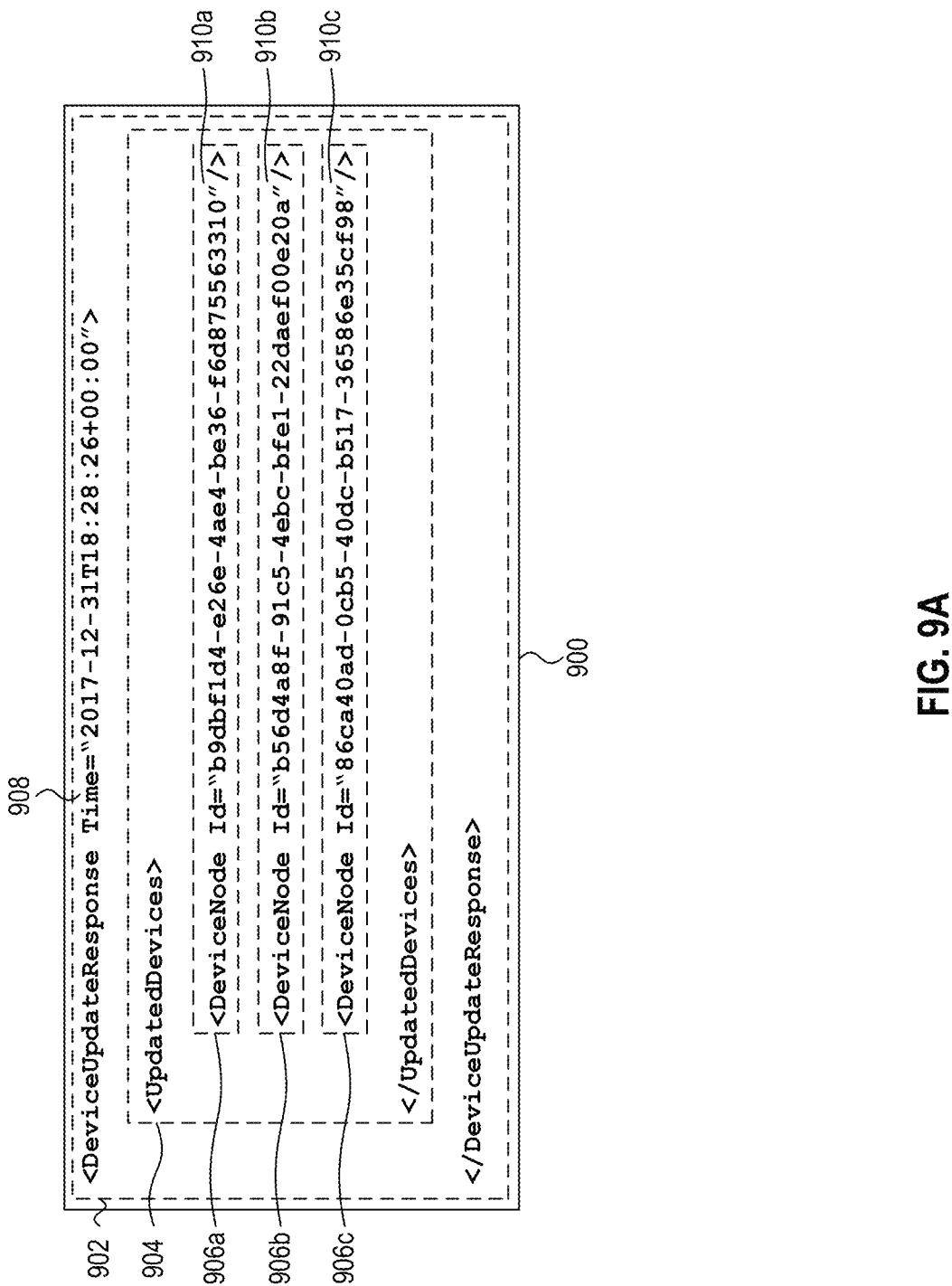
FIG. 9A depicts an example of an implementation of a message identifying which device nodes have available updates in accordance with aspects described herein.

In FIG. 9A, the structure of an example message 900 identifying which device nodes have available updates is shown. As noted above and described in further detail below, a user-operated device may poll a device management server to evaluate whether any updates are available for the device nodes that user-operated device is authorized to access. In response to this poll, the device management server may transmit, to the user-operated device, a message having a list of those device nodes the user-operated device is authorized to access. The message 900 of FIG. 9 is one example of such a message.

The message 900 may be sent from a device management server to a user-operated device in response to a poll of the device management server by the user-operated device. As seen in FIG. 9, the message 900, in this example, includes a device update response 902 having a list of updated device nodes 904. The list of updated device nodes 904, in this example, includes device node entries 906a-c corresponding to three device nodes of a local network of interconnected devices. A list of updated device nodes may include more, fewer, or no device node entries depending on whether and to what extent updates are available for the device nodes a user-operated device is authorized to access. As described in further detail below, a user-operated device may iterate over the list of updated device nodes 904 in order to individually request the current update packages available for the device nodes listed. The device update response 902 includes a timestamp indicating a date and time the message 900 was transmitted—e.g., Dec. 31, 2017 a 6:28:26 PM. Each of the device node entries 906a-c includes a respective device ID 910a-c of the corresponding device node. The message 900 may include information in addition to the device update response 902. It should also be appreciated that, although the message 900 is structured according to an XML-based format, alternative formats may be selectively employed to structure the message and the information contained therein.

In FIG. 9B, the structure of an example message 950 indicating the update information for a device node is shown. The message 950 represents an example of an implementation of the update package (e.g. update package 724) discussed above, for example, with reference to FIG. 7. As noted above and described in further detail below, a user-operated device may request the current update package available for a device node. For example, the control application (e.g., control application 726 in FIG. 7) at a user-operated device (e.g., user-operated device 706 in FIG. 7) may submit, to the device management server, a request for the current update package available for a specified device node. The control application may specify a particular device node by, for example, including the device ID for that device node in the request transmitted to the device management server. As described above, the control application may obtain the device ID in a message (e.g., message 900 in FIG. 9) received from the device management server that includes a list of those device nodes the user-operated is authorized to access.

As seen in FIG. 9B, the message 950 includes device update information 952 pertaining to a device node. The device update information 952, in this example, includes the device ID 954 of the device node, a sequence identifier 956 for the message, a list of authorized user-operated devices 958, and values for various operating parameters of the device node which, in this example, include a local authentication operating parameter 960 indicating whether to enable or disable local authentication at the device node is enabled, an assigned bridge operating parameter 962 indicating whether the device node is assigned to a bridge (i.e., gateway) device node at the local network of interconnected devices, and an enabled/disabled operating parameter 964 indicating whether to enable or disable the device node itself. The sequence identifier 956 may be utilized by the corresponding device node to determine whether the message 950 is represents an update package that is more recent than the most recent update package received by the device node. The sequence identifier 956, in this example, is a sequence number. As noted above, however, a sequence identifier may alternatively be implemented as a timestamp. The list of authorized user-operated devices 958, in this example, includes user-operated device entries 966a-c corresponding to three user-operated devices that are authorized to access the corresponding device node. A list of authorized user-operated devices may include more, fewer, or node user-operated device entries depending on which user-operated devices, if any, have been authorized to access the corresponding device node. Each of the user-operated device entries 966a-c includes a respective user-operated device ID 968a-c of the corresponding user-operated device that is authorized to access the device node. Again, it should be appreciated that, although the message 950 is structured according to an XML-based format, alternative formats may be selectively employed to structure the message and the information contained therein.

Disabling the device node itself may include disabling one, some, or all of the operations device node is configured to perform. It should be appreciated, however, that when a device node is disabled, it may still perform some of its operations. For example, disabling the device node may include putting the device node into a sleep mode in which it will only return to a wake mode upon receipt of a command from an administrator user-operated device and otherwise ignore commands and/or messages from other (non-administrator) user-operated devices or other devices nodes of the network of local interconnected devices. In another example, disabling the device node may include completely powering-off the device node or putting the device into a sleep mode in which it will not respond to any messages and/or commands from any user-operated device or other device node. In this other example, it may be necessary for the user to activate a physical switch at the device node in order to power-on the device node or wake it from the sleep mode. Such selective disabling of one or more features of a device node advantageously allows an administrator to disable a device nodes operational capabilities (e.g., preventing a door lock from unlocking during vacation) while maintaining communication capabilities which can have the benefit of sustaining the health of the network of device nodes (e.g., the wireless mesh network).

Figure 10:
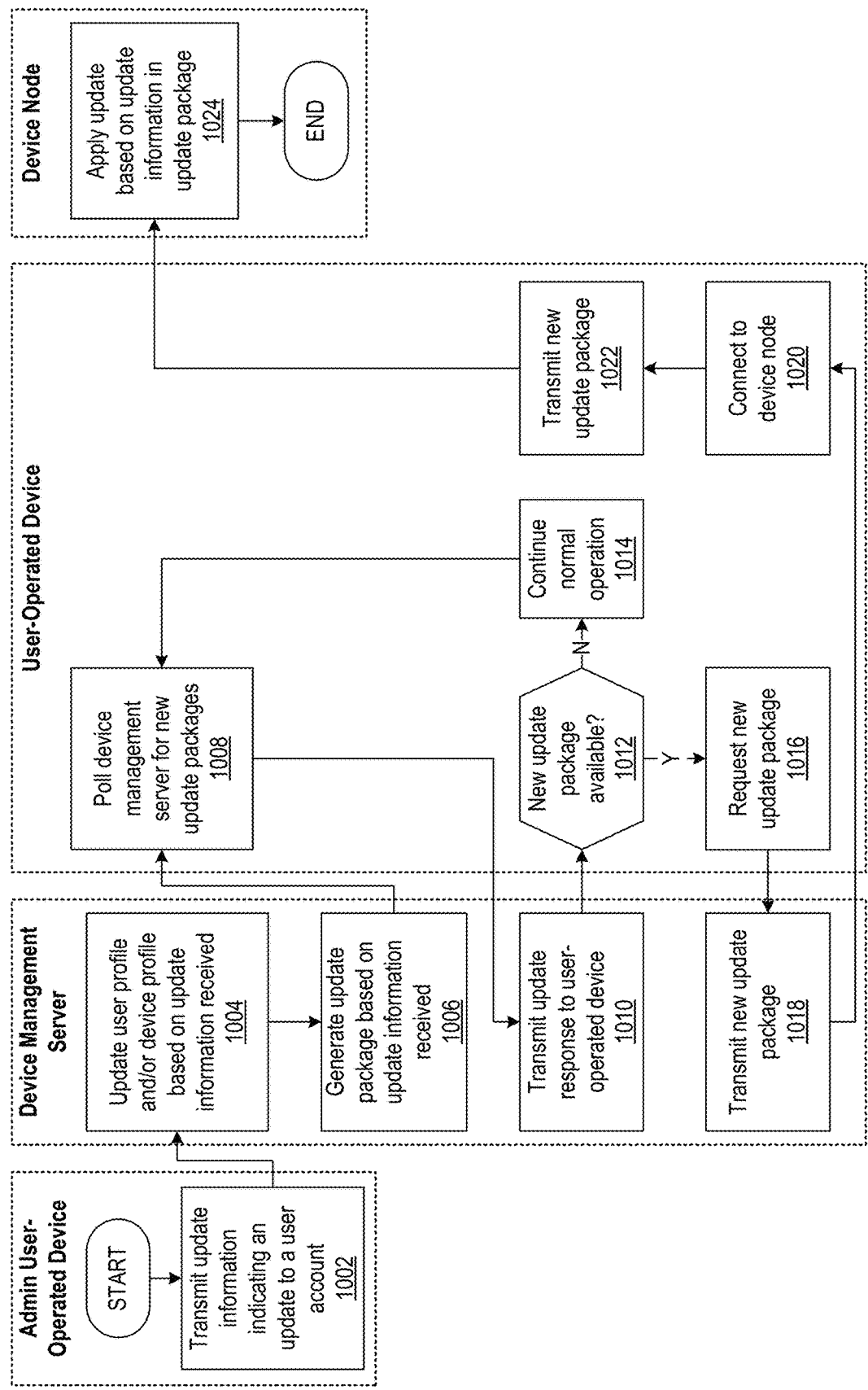
FIG. 10 depicts a flowchart of example method steps for delivering an update package to a user-operated device and to a device node in accordance with aspects described herein.

Turning now to FIG. 10, a flowchart 1000 of example method steps for delivering an update package to a user-operated device and to a device node is shown. The steps discussed by way of example below are respectively performed by an administrator user-operated device (e.g., administrator user-operated device 702 in FIG. 7), a device management server (e.g., device management server 704 in FIG. 7), a user-operated device (e.g., user-operated device 706 in FIG. 7), and a device node (e.g., device node 708 in FIG. 7) of a local network of interconnected devices.

The process, in this example, starts when the administrator user-operated device transmits, to the device management server, update information indicating an update to a user account (1002). As discussed above, the update information may include, among other examples, a update to the list of user-operated devices that are authorized to access one of the device nodes of the local network of interconnected devices associated with the user account. After receiving the update information, the device management server updates the user profile and/or the device profile based on the update information received (1004). Continuing the previous example, the update to the device profile may be an update to the list of user-operated devices that are authorized to access the device node corresponding to the device profile, e.g., adding one or more new user-operated devices to the list and/or removing one or more existing user-operated devices from the list. The device management server then generates, based on the update information received, an update package for the device node corresponding to the device profile (1006). As described above, the device management server may configure the update package generated with a sequence identifier (e.g., a timestamp) to indicate the new update package is the most recent update package available for the device node.

After the update package is generated, the user-operated device polls the device management server for any new update packages (1008) that are available for those device nodes the user-operated device has (at least previously) been authorized to access. As described above, the user-operated device may poll the device management server after a triggering event, e.g., launching a control application (e.g., control application 726 in FIG. 7) at the user-operated device, the control application obtaining focus at the user-operated device, and/or selection of the device node from a list of device nodes displayed by the control application. As also described above, the device management server may transmit, to the user-operated device, a list of those device nodes the user-operated device has (at least previously) been authorized to access, and the user-operated device may iterate through that list of device nodes to explicitly request, from the device management server, the most recent update package available for each device node. Additionally or alternatively, the user-operated device may explicitly request, from the device management server, the most recent update package available for a selected device node. If the user-operated device determines a new update package is not yet available (1012:N), then the user-operated device continues typical operation (1014) which may include, for example, typical login and authentication procedures to grant access to a selected device node. The user-operated device may again poll the device management server for any new update packages (1008) after a subsequent triggering event.

If, however, the user-operated device determines a new update package is available (1012:Y)—e.g., by receiving a list of newly available update packages from the device management server—then the user-operated device requests, from the device management server, the new update package that is available (1016). As described above, the request for the update package may identify the corresponding device node using the unique identifier (e.g., a serial number) of that device node. After receiving the request, the device management server transmits the requested update package to the user-operated device (1018). The user-operated device then connects to the corresponding device node (1020) and transmits, to that device node, the new update package (1022). The user-operated device may connect to the device node close in time to the time the user-operated device receives the new update package from the device management server—e.g., in association with an attempt to access the device node. The user-operated device may connect to the device node later in time to the time the user-operated device receives the new update package—e.g., independent of any subsequent attempt to access the device node. Furthermore, the user-operated device may establish a connection with the device node prior to any authentication or authorization procedures performed to grant the user-operated device access to the device node. In other words, the connection between the user-operated device and the device node may be a preliminary connection used to commence subsequent authentication and authorization procedures.

After receiving the update package from the user-operated device, the device node applies updates to its operational parameters based on the update information included in the update package (1024). As described above, the updates to the operational parameters may include updates to the list of user-operated devices that are authorized to access the device node, whether local authentication is enabled at the device node, and the like. It should also be recognized that the steps depicted by way of example in FIG. 10 assumes the update package received from the device management server is the most recent update package available for the device node (e.g., the update package with the most recent timestamp) and that the update package has not been previously transmitted to the device node (e.g., by another user-operated device). As described above, the device node is configured to determine whether an update package received from a user-operated device is more recent than the most recent update package the device node has previously received (e.g., by comparing the respective timestamps of the update packages). Accordingly, in circumstances where the device node determines the update package received is not the most recent update package available or where the device node determines it has already received the most up-to-date update package, the device node may discard the update package received from the user-operated device.

Figure 11:
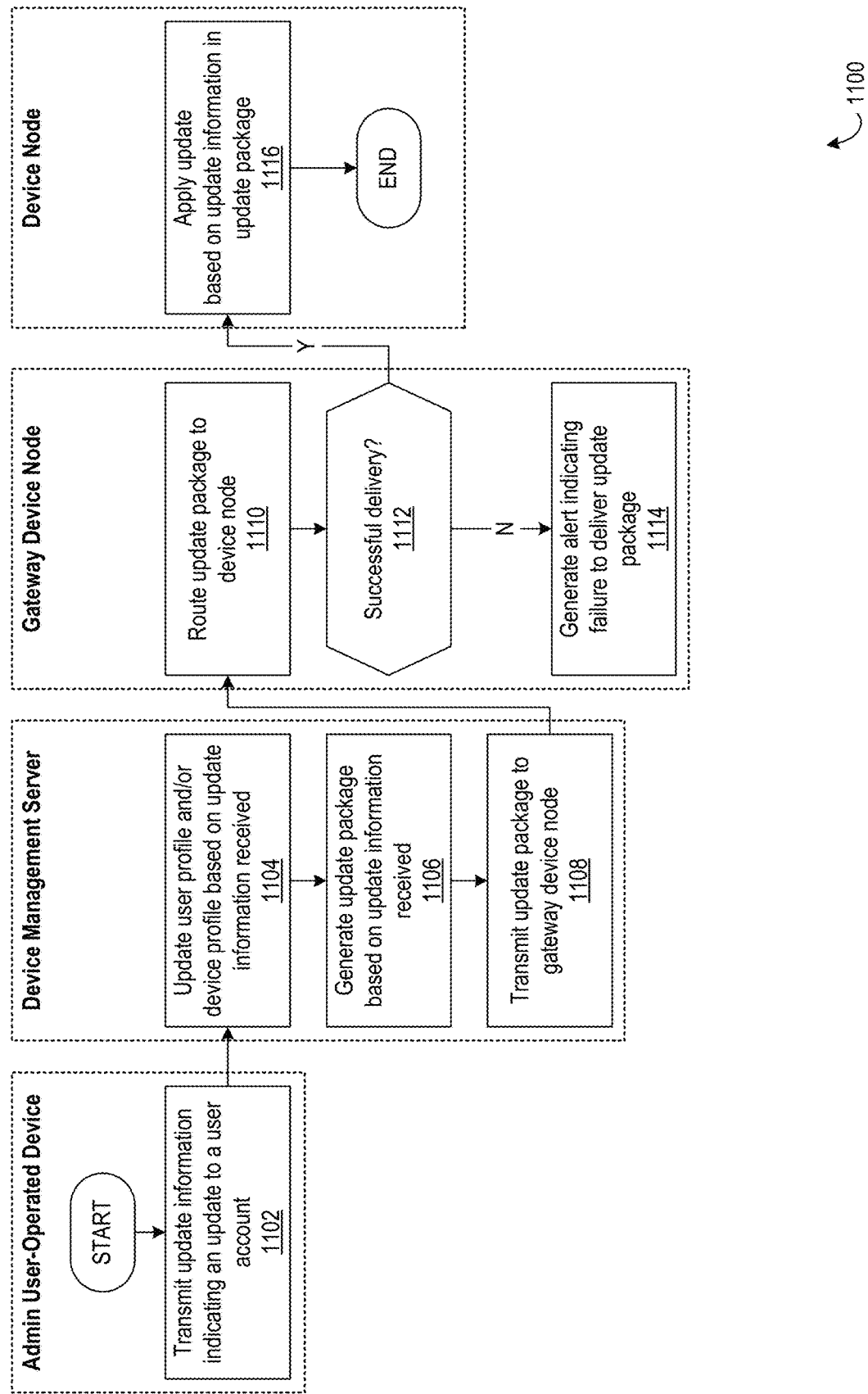
FIG. 11 depicts another flowchart of example method steps for delivering an update package to a device node in accordance with aspects described herein.

In FIG. 11, a flowchart of 1100 of example method steps for delivering an update package to a device node along an alternative path is shown. The steps discussed by way of example below are respectively performed by an administrator user-operated device (e.g., administrator user-operated device 702 in FIG. 7), a device management server (e.g., device management server 704 in FIG. 7), a gateway device node (e.g., gateway device node 734 in FIG. 7) of a local network of interconnected devices, and a device node (e.g., device node 708 in FIG. 7) of the local network of interconnected devices.

The process, in this example, similarly starts when the administrator user-operated device transmits, to the device management server, update information indicating an update to a user account (1102). After receiving the update information, the device management server likewise updates the user profile and/or the device profile based on the update information received (1104). The device management server also likewise generates, based on the update information received, an update package for the device node corresponding to the device profile (1106). Having generated the new update package, the device management server transmits the update package to the gateway device node (1108) deployed at the local network of interconnected devices at which the corresponding device node is also deployed.

After receiving the update package from the device management server, the gateway device node routes the update package to the target device node (1110). Routing the update package to the target device node includes transmitting the update package to the target device node directly, e.g., a short-range wireless communication standard or a low-power wireless communication standard as described above if the gateway device node and the target device node are within wireless range of each other. Routing the update package to the target device node also includes using a wireless mesh networking protocol to transmit the update package via one or more other device nodes of the local network of interconnected devices if the gateway device node and the target device node are not within wireless range of each other.

The gateway device node, in this example, is configured to determine whether the update package was successfully delivered to the target device node (1112). The gateway device node may make this determination, for example, based on whether the gateway device node receives a message from the device node confirming receipt of the update package. If the gateway device node cannot confirm successful delivery of the update package to the device node (1112:N), then the gateway device node generates an alert indicating the failure to deliver the update package to the device node (1114). The gateway device node may, for example, transmit the alert back to the device management server and/or to an administrator user-operated device. If, however, the update package is successfully delivered to the target device node (1112:Y), then the device node applies updates to its operational parameters based on the update information included in the update package (1116) as described above. Again, the steps depicted by way of example in FIG. 11 assumes the update package received is the most recent update package available and that it has not been previously transmitted to the device node. As noted above, the device node may discard (e.g., delete, ignore) the update package received if it determines the received update package is not the most up-to-date update package or if it determines it has already received that update package.

Figure 12:
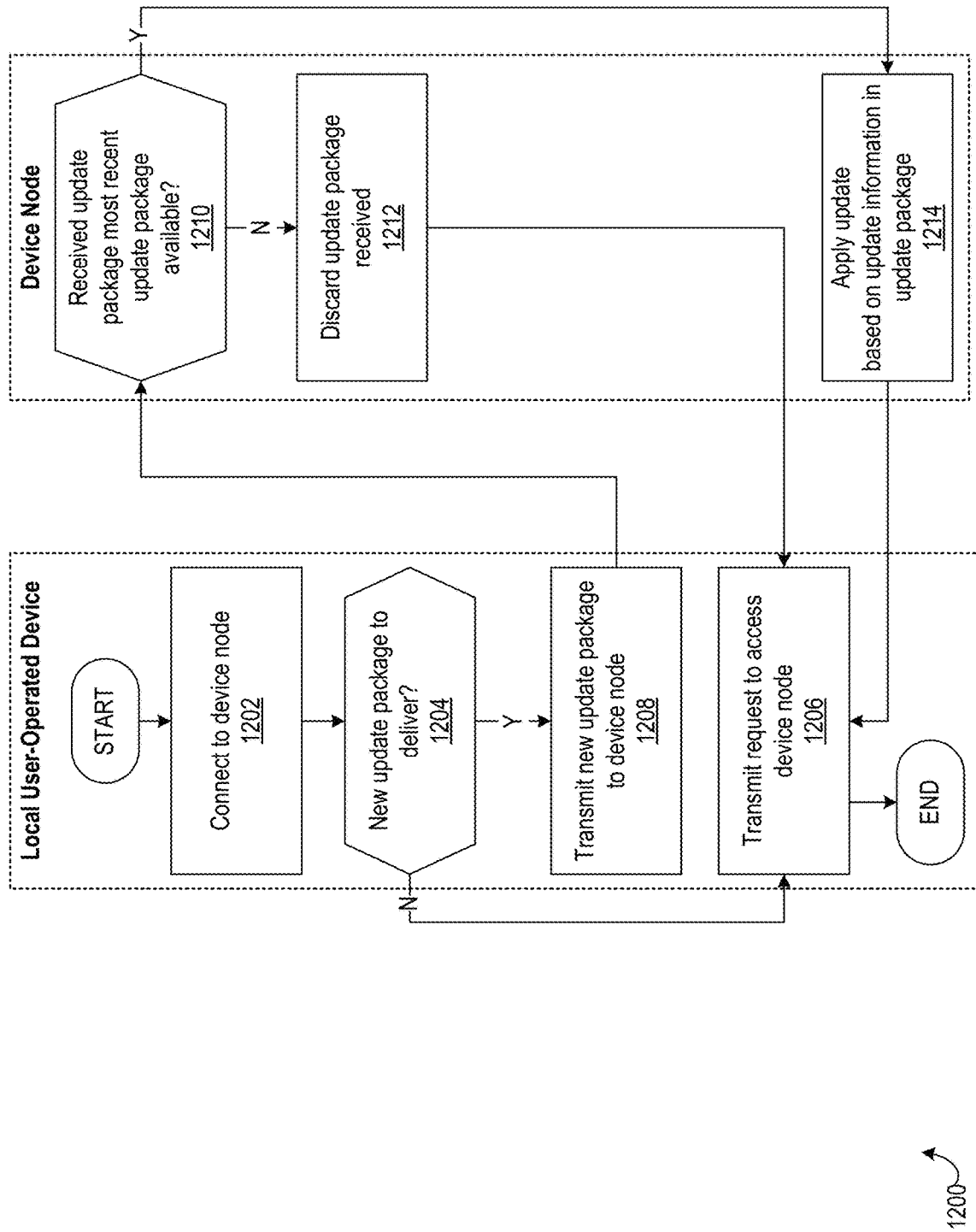
FIG. 12 depicts a flowchart of example method steps for delivering an update package from a user-operated device to a device node in accordance with aspects described herein.

Referring now to FIG. 12, a flowchart 1200 of example method steps for delivering an update package from a user-operated device to a device node is shown. The steps discussed by way of example below are respectively performed by a user-operated device (e.g., user-operated device 706 in FIG. 7) and a device node (e.g., device node 708 in FIG. 7) of a local network of interconnected devices in which the user-operated device is located locally relative to the local network of interconnected devices, e.g., in direct signal communication with the device node or in indirect signal communication with the device node via one or more other device nodes of the local network of interconnected devices.

The process, in this example, starts when the user-operated device initially connects to the device node (1202). As noted above, this initial connection may be established prior to any procedures performed to authenticate and authorize the user-operated device. The user-operated device determines whether it has a new update package to deliver to the device node (1204). If not (1204:N), then the user-operated device may continue typical operation (1206) which, as noted above, may include typical login and authentication procedures to grant access to the device node. If, however, the user-operated device does have a new update package to deliver to the device node (1204:Y), then the user-operated device transmits the new update package to the device node (1208). If the user-operated device is within wireless range of the device node, then the user-operated device may directly transmit the update package to the device node using, for example, a short-range wireless communication standard or a low-power wireless communication standard. If the user-operated device is not within wireless range of the device node, then the user-operated device may indirectly transmit the update package to the device node by using a wireless mesh networking protocol to route the update package through one or more other device nodes of the local network of interconnected devices. As noted above, a user-operated device that is ultimately denied access to operate the device node may nevertheless connect to the device node and deliver the update package.

As noted above, the device node is configured to determine whether a newly received update package is the most recent update package available (1210). If not (1210:N), then the device node discards (e.g., deletes, ignores) the received update package. If, however, the device node determines the received update package is the most recent update package available (1210:Y), then the device node applies updates to its operational parameters based on the update information included in the newly received update package (1214) as described above.

Authentication of User-Operated Devices

Figure 13:
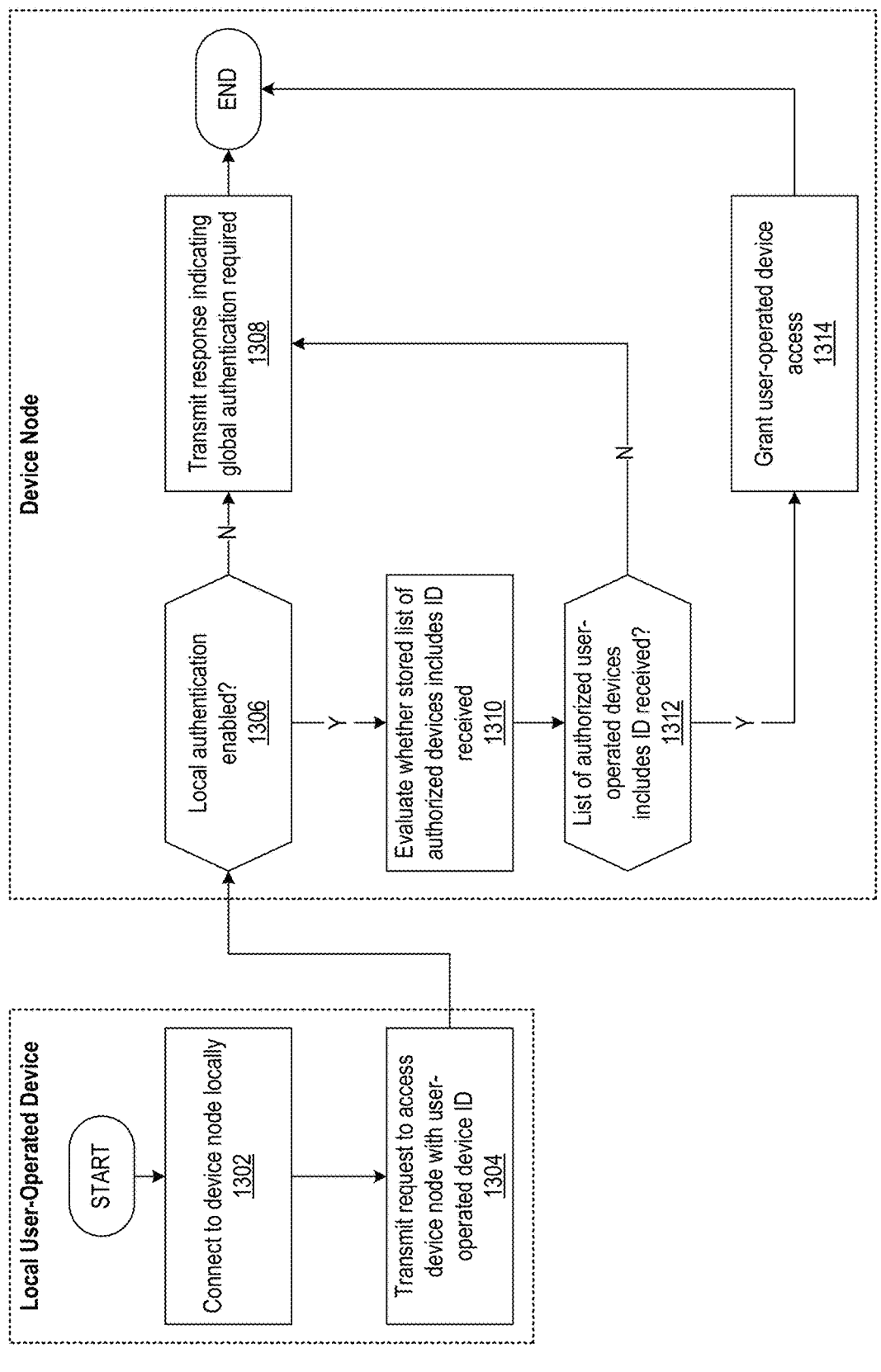
FIG. 13 depicts a flowchart of example method steps for authenticating a local user-operated device in accordance with aspects described herein.
Figure 14:
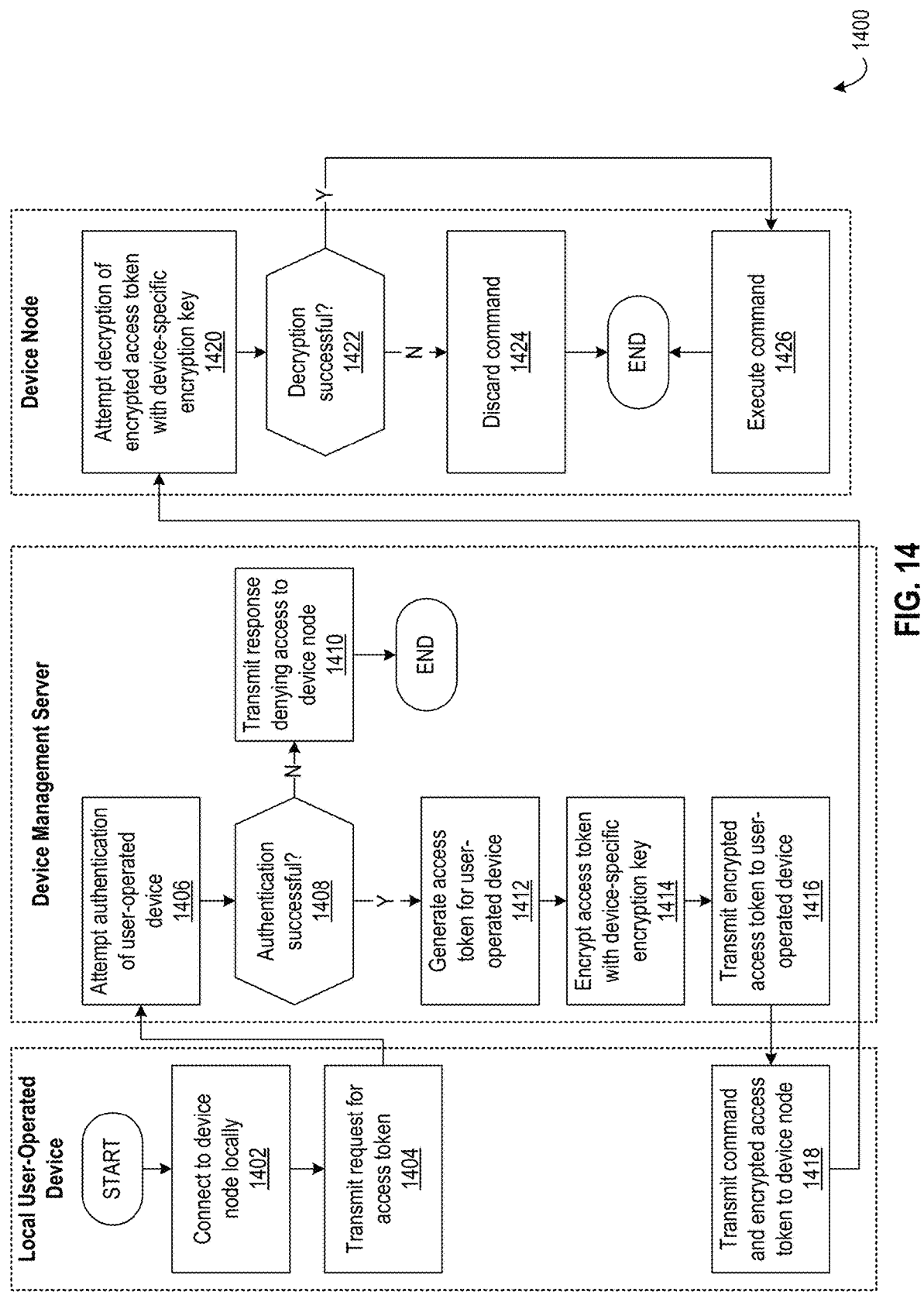
FIG. 14 depicts another flowchart of example method steps for authenticating a local user-operated device in accordance with aspects described herein.

In FIGS. 13-14 below, example method steps for authenticating a user-operated device requesting access to a device node of a local network of interconnected devices are shown. The steps discussed below by way of example illustrate various techniques for authenticating a user-operated device when the user-operated device is located locally or remotely relative to the device node and when local authentication is enabled and disabled at the device node. As described above, a device node may be configured to perform various operations, one of which may be a local authentication operation to locally authenticate user-operated devices attempting to access the device node. As also described above, local authentication may be enabled and disabled at a device node. A device node may thus store an indication (e.g., a flag) of whether local authentication is enabled or disabled at the device node.

In FIG. 13, for example, a flowchart 1300 of example method steps for authenticating a local user-operated device with local authentication enabled is shown. The steps discussed by way of example below are respectively performed by a user-operated device (e.g., user-operated device 706 in FIG. 7) and a device node (e.g., device node 708 in FIG. 7) of a local network of interconnected devices in which the user-operated device is local relative to the device node, e.g., in direct signal communication with the device node or in indirect signal communication with the device node via one or more other device nodes of the local network of interconnected devices.

The process, in this example, starts when the user-operated device locally connects to the device node (1302). After establishing a connection with the device node, the user-operated device transmits, to the device node, a request to access the device node in which the request includes an identifier of the user-operated device (1304). It should be appreciated that the user-operated device may transmit the request to access the device node after transmitting, to the device node, any new update packages available as described above.

After receiving the request, the device node determines whether local authentication is enabled at the device node (1306). If not (1306:N), then the device node transmits, to the user-operated device, a response indicating that global authentication is required (1308) before the user-operated device will be granted access to the device node. Global authentication of a user-operated device is discussed below with reference to FIG. 14. If, however, local authentication is enabled at the device node (1306:Y), then the device node evaluates whether its stored list of authorized devices includes the identifier of the user-operated device received in the request (1310) thus indicating the user-operated device is authorized to access the device node. If the device node determines the list of authorized devices does not include the identifier of the user-operated device (1312:N), then the device node transmits, to the user-operated device, a response indicating that global authentication is required (1308) before the user-operated device will be granted access to the device node. If, however, the device node determines that the list of authorized devices does include the identifier of the user-operated device (1312:Y), then the device node grants access to the user-operated device (1314) after which the user-operated device may transmit commands to be consumed and executed by the device node.

In FIG. 14, a flowchart 1400 of example method steps for authenticating a local user-operated device with local authentication disabled is shown. The steps discussed by way of example below are respectively performed by a user-operated device (e.g., user-operated device 706 in FIG. 7), a device management server (e.g., device management server 704 in FIG. 7), and a device node (e.g., device node 708 in FIG. 7) of a local network of interconnected devices in which the user-operated device is local relative to the device node, e.g., in direct signal communication with the device node or in indirect signal communication with the device node via one or more other device nodes of the local network of interconnected devices.

The process, in this example, start when the user-operated device locally connects to the device node (1402). After establishing a connection with the device node, the user-operated device transmits, to the device management server, a request for an access token (1404) used to authenticate user-operated device. It should be appreciated that the user-operated device may transmit the request for the access token after receiving, from the device node, a response indicating that global authentication is required before the user-operated device will be granted access to the device node. In addition, the request for the access token may include a unique identifier for the device node, e.g., the serial number of the device node.

After receiving the request for the access token, the device management server attempts to authenticate the user-operated device (1406). Any suitable techniques for authenticating the user-operated device may be employed by the device management server including, for example, a username/password, two-factor authentication, one-time passwords, digital certificates, and the like. If the device management server cannot successfully authenticate the user-operated device (1408:N), then the device management server transmits a response to the user-operated device indicating that access to the device node is denied (1410). If, however, the device management server can successfully authenticate the user-operated device (1408:Y), then the device management server generates an access token for the user-operated device (1412). The access token may be, for example, a random alphabetic, numeric, or alphanumeric string of x bits, e.g., a 128-bit alphanumeric string, a 256-bit alphanumeric string, and the like. The device management server then encrypts the access token with a device-specific encryption key associated with the device node (1414) to generate an encrypted access token and transmits the encrypted access token to the user-operated device (1416).

Since the access token is encrypted using a device-specific encryption key for the device node, the encrypted access token may function a digital key used to gain access to the device node. In this regard, the encrypted access token may also be referred to as a digital key. The device management server may dynamically generate a new access token for each request received from each user-operated device. The device management server may also set an expiration (e.g., an expiration timestamp) for the access token after which a user-operated device cannot use the access token to obtain access to the corresponding device node. Using an expiration may account for variances between the clocks of different the device management server instances, gateways, device nodes, and/or access devices. An example expiration timeframe may be about five (5) minutes. The expiration timeframe may be a configurable parameter stored at the device management server. The expiration timeframe may also be device node-specific and/or device-type specific such that different expiration timeframes may be set and/or configured for different types of device nodes and/or particular device nodes. In addition, the device management server may also apply an access control schedule that indicates one or more timeframes (e.g., 12:00 PM-1:00 PM) within which a user-operated device is authorized to access the device node. In this regard, the device management server may determine whether the user-operated device has requested to access the device node inside or outside a specified timeframe in the access control schedule. If the user-operated device requests to access the device node inside an authorized timeframe, the device management server may grant the user-operated device access to the device node. Otherwise, if the user-operated device requests to access the device node outside all specified timeframes, the device management server may deny the user-operated device access to the device node.

After receiving the encrypted access token from the device management server, the user-operated device transmits a command and the encrypted access token to the device node (1418). The user-operated device may transmit the encrypted access token to the device node before, with, or after transmission of the command to the device node. For example, the user-operated device may transmit to the device node a wireless communication having a payload that includes both the encrypted access token and a selected command for the device node to execute.

After receiving the encrypted access token and the command, the device node attempts to decrypt the encrypted access token with its device-specific encryption key (1420). If the device node cannot successfully decrypt the encrypted access token (1422:N), then the device node discards (e.g., deletes, ignores) the command received from the user-operated device (1424). Otherwise, if the device node can successfully decrypt the encrypted access token (1422:Y), then the device node executes the command received (1426). The device node may determine whether the access token has been successfully decrypted by determining whether a unique value stored at the device node matches a unique value obtained from the access token after a decryption attempt.

Figure 15:
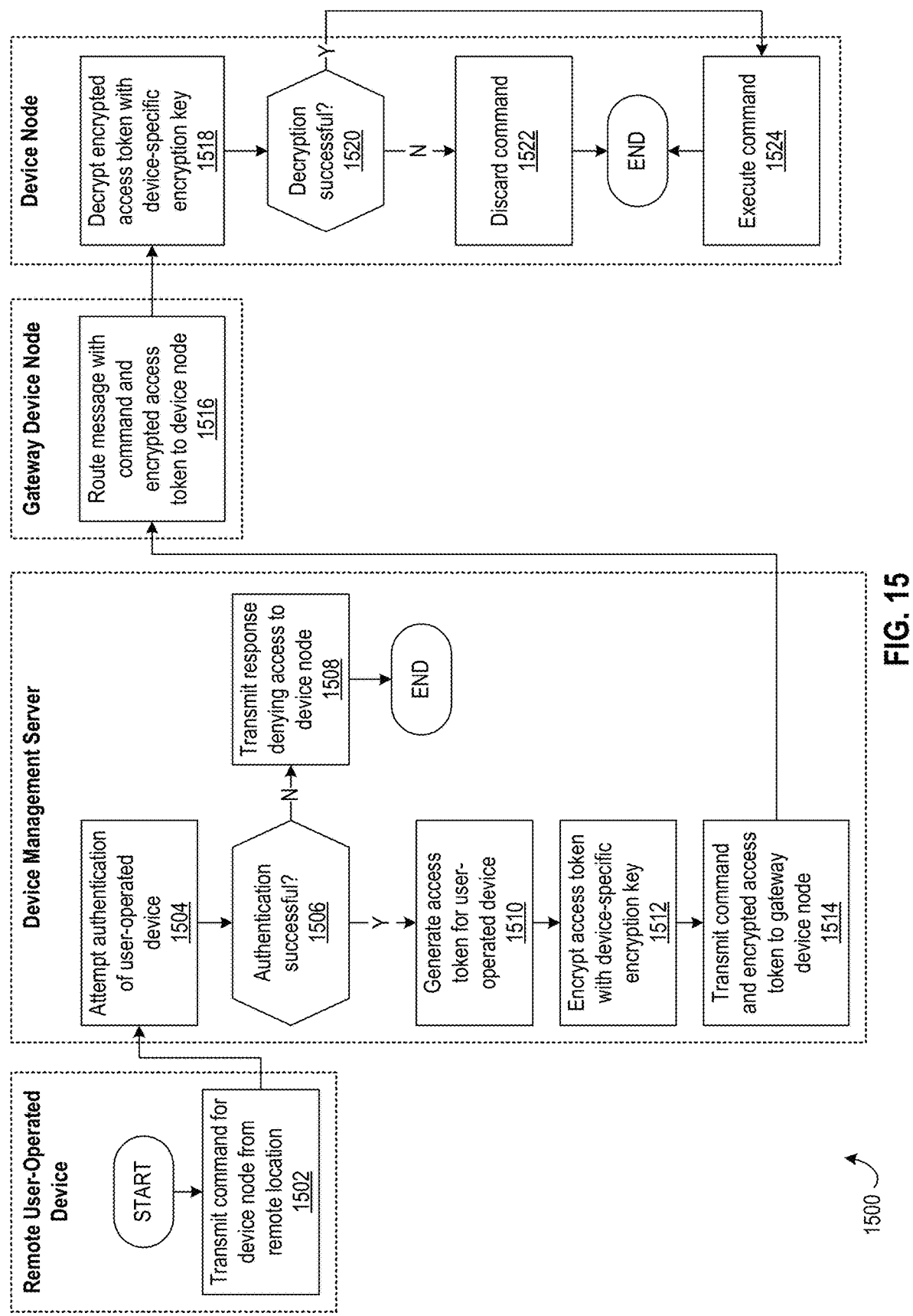
FIG. 15 depicts a flowchart of example method steps for delivering a command from a remote user-operated device to a device node in accordance with aspects described herein.

In FIG. 15, a flowchart 1500 of example method steps for delivering a command from a remote user-operated device to a device node is shown. The steps discussed by way of example below are respectively performed by a user-operated device (e.g., user-operated device 706 in FIG. 7), a device management server (e.g., device management server 704 in FIG. 7), a gateway device node (e.g., gateway device node 734 in FIG. 7) of a local network of interconnected devices, and a device node (e.g., device node 708 in FIG. 7) of a local network of interconnected devices in which the user-operated device is located remotely relative to the local network of interconnected devices, e.g., in indirect signal communication with the device node via the device management server and the gateway device node.

The process, in this example, starts when the remotely-located user-operated device transmits a command for the device node from a remote location (1502) relative to the local network of interconnected devices. The user-operated device may transmit the command after a control application (e.g., control application 726 in FIG. 7) executing at the user-operated device has received user input selecting an operation from a list of operations the device node is configured to perform which the control application presents at a display of the user-operated device. The command transmitted from the user-operated device may thus correspond to the selected operation. The control application may present the list of operations for the device node after receiving user input selecting the device node from a list of device nodes the user-operated device is authorized to access which the control application presents at the display of the user-operated device. The control application may present the list of device nodes after receiving user input selecting a local network of interconnected devices from a list of local networks of interconnected devices having device nodes the user-operated device is authorized to access. For example, the control application may present a list of local networks of interconnected devices that lists a first local network of interconnected devices associated with the user's residence and a second local network of interconnected devices associated with the user's office. The control application may present the lists of device nodes and/or local networks of interconnected devices after a successfully authenticating the user (e.g., after a successful login using a username/password). The user-operated device may transmit the selected command in a message that also includes, for example, the unique identifier of the user-operated device and the unique identifier of the selected device node.

After receiving the command, the device management server attempts to authenticate the user-operated device (1504), e.g., using any of the techniques noted above. If the device management server cannot successfully authenticate the user-operated device (1506:N), then the device management server transmits a response to the user-operated device indicating that access to the device node is denied (1508). If, however, the device management server can successfully authenticate the user-operated device (1506:Y), then the device management server generates an access token for the user-operated device (1510), e.g., of the type described above. The device management server then encrypts the access token with a device-specific encryption key associated with the device node (1512) to generate an encrypted access token and transmits, to the gateway device node, the encrypted access token and the command received from the user-operated device (1514). The device management server may include the encrypted access token and the command in the payload of a single message. The device management server may also transmit the encrypted access token and the command in the respective payloads of separate messages.

After receiving the encrypted access token and the command from the device management server, the device node may route the encrypted access token and the command to the selected device node (1516). The gateway device node may transmit the encrypted access token and the command in a single message or in multiple messages. To route the encrypted access token and the command to the selected device node, the gateway device node may transmit them directly to the selected device node (e.g., using a short-range wireless communication standard or a low-power wireless communication standard) if it is within wireless range of the selected device node, or the gateway device node may transmit them indirectly to the selected device node (e.g., using a wireless mesh networking protocol) via one or more other device nodes of the local network of interconnected devices.

After receiving the encrypted access token and the command, the device node attempts to decrypt the encrypted access token with its device-specific encryption key (1518). If the device node cannot successfully decrypt the encrypted access token (1520:N), then the device node discards (e.g., deletes, ignores) the command received (1522). Otherwise, if the device node can successfully decrypt the encrypted access token (1520:Y), then the device node executes the command received (1524).

The commands transmitted from the user-operated device to the device node represent operations the device node is commanded to perform. In this regard, the commands may also be referred to as operational commands. Operational commands may include physical actions the device node is to perform or information the device node is to provide. For example, where the device node is an electronic lock, operational commands corresponding to physical actions may include an unlock command that physically unlocks the electronic lock as well as a lock command that physically locks the electronic lock. In another example, whether the device node is a sensor, operational commands corresponding to providing information may include a sensor reading command that causes the sensor to return the value of a sensor reading.

It should be appreciated that encryption techniques may be employed to secure the messages and/or the payloads of the messages transmitted between the user-operated device, device management server, gateway device node, and/or target device node. For example, one or more device-specific encryption keys may be used to encrypt one or more of the commands selected for the device to execute and/or the payloads of the messages that include the selected commands. Furthermore, dual encryption techniques may be employed. For example, a user-operated device may be provided with multiple device-specific encryption keys associated with a device node that user-operated device is authorized to access. The user-operated device may encrypt the selected command with a first device-specific encryption key associated with the selected device node to obtain an encrypted command, include the encrypted command in a payload of a message with the unique identifiers of the user-operated device and the selected device node, and then encrypt that payload with a second device-specific encryption key associated with the selected device node to obtain an encrypted payload. The user-operated device may then transmit a message with the encrypted payload directly or indirectly to the selected device node. The device node may decrypt the encrypted payload with the second device-specific encryption key in order to obtain the unique identifiers and the encrypted command, and then decrypt the encrypted command with the first device-specific encryption key to obtain the command to execute.

Example Computing Environment

Figure 16:
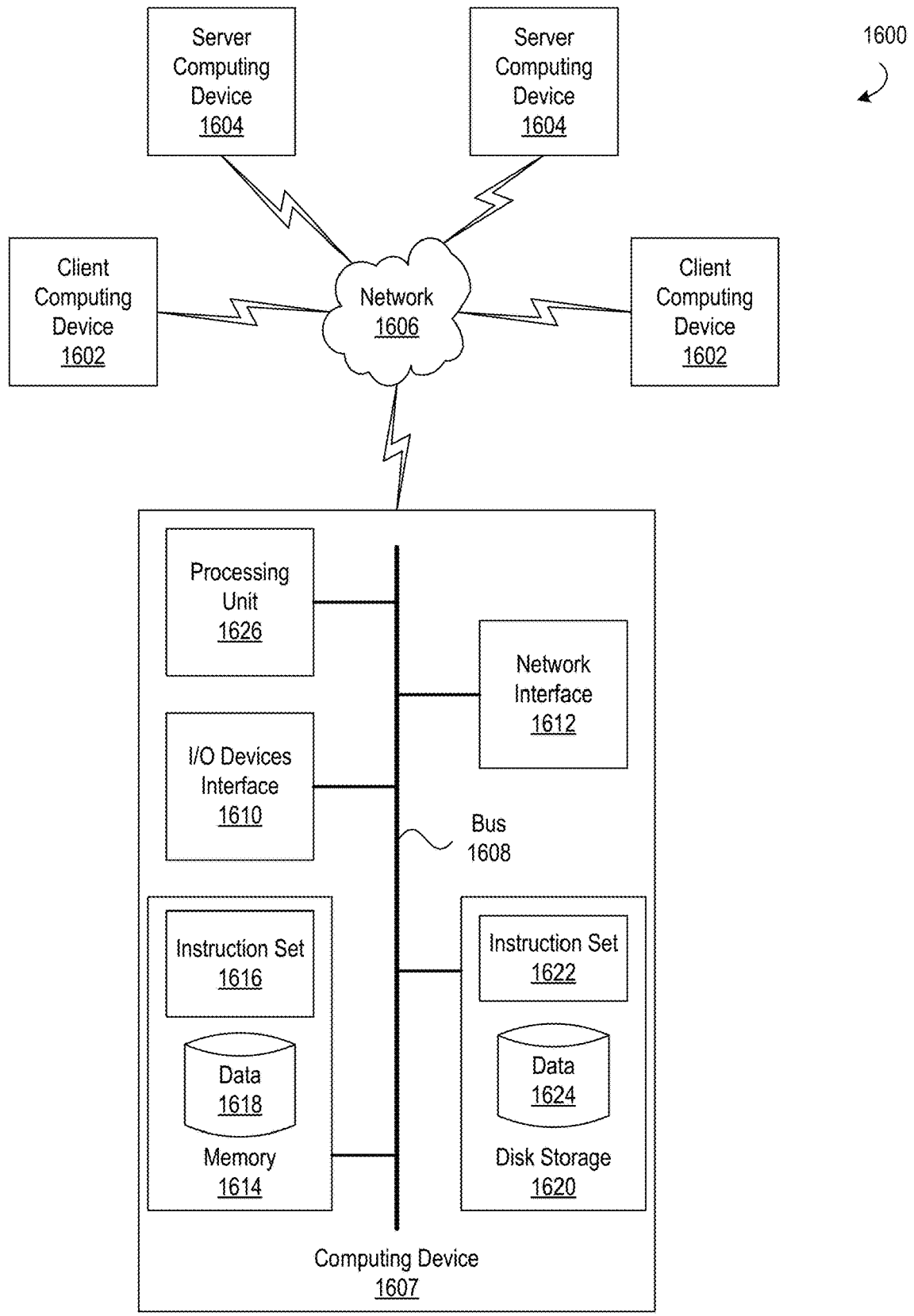
FIG. 16 depicts an example of an implementation of a computing environment in which aspects of the present disclosure may be implemented.

Referring now to FIG. 16, an example of an implementation of a computing environment 1600 in which aspects of the present disclosure may be implemented is shown. The computing environment may include both client computing devices 1602 and server computing devices 1604. The client computing devices 1602 and server computing devices 1604 may provide processing, storage, input/output devices, application programs, and the like. Client computing devices 1602 may include, e.g., desktop computers, laptop computers, tablet computers, palmtop computers, smartphones, smart televisions, and the like. Client computing devices 1602 may also be in signal communication to other computing devices, including other client computing devices 1602 and server computing devices 1604 via a network 1606. The network 1606 may be part of a remote access network, a wide area network (e.g., the Internet), a cellular network, a worldwide collection of computers, local area networks, and gateways that currently use respective protocols (e.g., FTP, HTTP, TCP/IP, etc.) to communicate with one another. Other electronic device architectures and computer network architectures may be selectively employed.

FIG. 16 also depicts a block diagram of one of a computing device 1607 of the computing environment 1600. The computing device 1607 contains a bus 1608 the computing device utilizes to transfer information among its components. The bus 1608 connects different components of the computing device 1607 (e.g., processor, disk storage, memory, input/output ports, network ports, etc.) and enables the transfer of information between those components. An I/O device interface 1610 is connected to the bus 1608. The I/O device interface 1610 connects various input and output devices (e.g., keyboard, mouse, microphone, camera, displays, printers, speakers, etc.) to the computing device 1607. A network interface 1612 is also attached to the bus 1608 and allows the computing device 1607 to connect to various other devices attached to a network (e.g., network 1606). The memory 1614 provides volatile storage for one or more instruction sets 1616 and data 1618 used to implement aspects described herein. Disk storage 1620 provides non-volatile storage for one or more instruction sets 1622 (e.g., an operating system) and data 1624 used to implement various aspects described herein. The processing unit 1626 is also attached to the bus 1608 and executes the instructions stored in the memory 1614 and/or the disk storage 1620. The instruction sets 1616 and 1622 as well as the data 1618 and 1624 include a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. At least a portion of the instructions may also be downloaded via the network 1606. As noted above, computer-readable media include all non-transitory computer-readable media and do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as, e.g., HTML, XML, JavaScript, and the like. The executable instructions may be stored on a computer readable medium such as a hard disk, optical disk, removable storage media, solid state memory, RAM, ROM, etc. The functionality of the program modules may be combined or distributed as desired in various embodiments. In addition, the functionality may be embodied in whole or in part in firmware or hardware equivalents such as integrated circuits, field programmable gate arrays (FPGAs), and the like. Various data structures may be used to more effectively implement one or more aspects of the disclosure, and such data structures are contemplated to be within the scope of the executable instructions and computer-usable data described herein.

Aspects of the disclosure have been described in terms of illustrative embodiments thereof. While illustrative systems and methods as described herein embodying various aspects of the present disclosure are shown, it will be understood that the disclosure is not limited to these embodiments. Modifications may be made particularly in light of the foregoing teachings. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A system comprising:
a server computing device; and
a first computing device comprising:
one or more first processors; and
first memory storing first instructions that, when executed by the one or more first processors, cause the first computing device to store an authentication parameter that configures the first computing device to:
select between at least (i) local authentication, by the first computing device, of a second computing device and (ii) remote authentication, by the server computing device, of the second computing device, and
disable local authentication when remote authentication is selected;
wherein the server computing device stores an update to the authentication parameter and is configured to perform the remote authentication, and wherein the update is encrypted using a public encryption key;
wherein the second computing device comprises:
one or more second processors; and
second memory storing second instructions that, when executed by the one or more second processors, cause the second computing device to:
wirelessly transmit, to the first computing device, an operational command corresponding to a selected operation to be performed by the first computing device;
receive the update to the authentication parameter from the server computing device, wherein the update is decrypted using a private encryption key;

before wirelessly transmitting the operational command to the first computing device, wirelessly transmit the update to the authentication parameter to the first computing device;
receive, from the server computing device, an updated list of one or more computing devices that are currently authorized to access the first computing device; and
before wirelessly transmitting the operational command to the first computing device, wirelessly transmit the updated list to the first computing device;
wherein the first instructions, when executed by the one or more first processors, further cause the first computing device to:
replace a list of one or more computing devices that have previously been authorized to access the first computing device with the updated list from the second computing device;
apply the update to the authentication parameter received from the second computing device, wherein applying the update to the authentication parameter configures the first computing device to perform one of the local authentication, by the first computing device, or the remote authentication, by the server computing device;
attempt to process the operational command from the second computing device after applying the update to the authentication parameter; and
after applying the update to the authentication parameter, attempt authentication of the second computing device.

2. The system of claim 1, wherein:
the first instructions, when executed by the one or more first processors, further cause the first computing device to:
after applying the update to the authentication parameter and before receiving the operational command from the second computing device, evaluate whether the second computing device is authorized to access the first computing device; and
based on determining that the second computing device is authorized to access the first computing device, receive the operational command from the second computing device.

3. The system of claim 2, wherein:
the first instructions, when executed by the one or more first processors, further cause the first computing device to grant the second computing device access to the first computing device based on determining the second computing device is authorized to access the first computing device; and
the second instructions, when executed by the one or more second processors, further cause the second computing device to wirelessly transmit the operational command to the first computing device based on the first computing device granting the second computing device access to the first computing device.

4. The system of claim 2, wherein:
the first instructions, when executed by the one or more first processors, further cause the first computing device to apply the updated list by modifying the list based on the updated list.

5. The system of claim 1, wherein:
the second instructions, when executed by the one or more second processors, further cause the second computing device to transmit, to the first computing device, an update to an operational parameter that controls an operation of the first computing device;
the first instructions, when executed by the one or more first processors, further cause the first computing device to, before attempting to process the operational command from the second computing device, apply the update to the operational parameter;
before the first computing device applies the update to the operational parameter, the first computing device does not comprise any indication that the second computing device is authorized to access the first computing device; and
after the first computing device applies the update to the operational parameter, the first computing device comprises an indication that the second computing device is authorized to access the first computing device.

6. The system of claim 1, wherein:
the second instructions, when executed by the one or more second processors, further cause the second computing device to transmit, to the first computing device, an indication that the second computing device is authorized to access the first computing device.

7. The system of claim 1, wherein the server computing device comprises:
one or more third processors; and
third memory storing third instructions that, when executed by the one or more third processors, cause the server computing device to wirelessly transmit the update to the authentication parameter to the second computing device based on receiving a request from the second computing device.

8. The system of claim 7, wherein:
the request comprises a unique identifier of the first computing device.

9. The system of claim 7, wherein:
the third instructions, when executed by the one or more third processors, further cause the server computing device to:
wirelessly transmit a unique identifier of the first computing device to the second computing device based on receiving the request and before wirelessly transmitting the update to the authentication parameter; and
wirelessly transmit the update to the authentication parameter to the second computing device based on receiving a second request from the second computing device, the second request comprising the unique identifier of the first computing device.

10. The system of claim 7, wherein:
the third instructions, when executed by the one or more third processors, further cause the server computing device to encrypt the update to the authentication parameter using an encryption key specific to the first computing device.

11. The system of claim 7, wherein:
the first computing device stores a plurality of operational parameters;
the update to the authentication parameter is one of a plurality of updates to the plurality of operational parameters; and
the third instructions, when executed by the one or more third processors, further cause the server computing device to wirelessly transmit, to the second computing device, a message comprising the plurality of updates to the plurality of operational parameters.

12. The system of claim 1, wherein:
the second computing device receives the update to the authentication parameter after initiating an attempt to access the first computing device.

13. The system of claim 1, wherein:
applying the update to the authentication parameter configures the first computing device to perform the remote authentication, by the server computing device, of the second computing device.

14. The system of claim 1, wherein the first instructions, when executed by the one or more first processors, further cause the first computing device to:
process, based on successful authentication of the second computing device, the operational command received from the second computing device.

15. A method comprising:
storing, by a first computing device, an authentication parameter that configures the first computing device to:
select between at least (i) local authentication, by the first computing device, of a second computing device and (ii) remote authentication, by a server computing device, of the second computing device, and
disable local authentication when remote authentication is selected;
wherein the server computing device stores an update to the authentication parameter and is configured to perform the remote authentication, and wherein the update is encrypted using a public encryption key;
wirelessly receiving, from the second computing device by the first computing device, an operational command corresponding to a selected operation to be performed by the first computing device;
before wirelessly receiving the operational command from the second computing device:
wirelessly receiving, from the second computing device by the first computing device, each of:
the update to the authentication parameter to the first computing device, wherein the update is decrypted using a private encryption key; and
an updated list of one or more computing devices that are currently authorized to access the first computing device which the second computing device received from the server computing device;
replacing, by the first computing device, a list of one or more computing devices that have previously been authorized to access the first computing device with the updated list received from the second computing device; and
applying, by the first computing device, the update to the authentication parameter received from the second computing device, wherein applying the update to the authentication parameter configures the first computing device to perform one of the local authentication, by the first computing device, or the remote authentication, by the server computing device;
after applying the update to the authentication parameter:
attempting, by the first computing device, to process the operational command from the second computing device; and
attempting, by the first computing device, authentication of the second computing device.

16. The method of claim 15, further comprising:
after applying the update to the authentication parameter and before receiving the operational command from the second computing device, evaluating, by the first computing device, whether the second computing device is authorized to access the first computing device; and
based on determining that the second computing device is authorized to access the first computing device, receiving, by the first computing device, the operational command from the second computing device.

17. The method of claim 16, further comprising:
granting, by the first computing device, the second computing device access to the first computing device based on determining the second computing device is authorized to access the first computing device; and
wirelessly receiving, from the second computing device and by the first computing device, the operational command to the first computing device based on the first computing device granting the second computing device access to the first computing device.

18. One or more non-transitory computer readable media comprising instructions that, when executed by at least one processor, cause a first computing device to:
store an authentication parameter that configures the first computing device to:
select between at least (i) local authentication, by the first computing device, of a second computing device and (ii) remote authentication, by a server computing device, of the second computing device, and
disable local authentication when remote authentication is selected;
wherein the server computing device stores an update to the authentication parameter and is configured to perform the remote authentication, and wherein the update is encrypted using a public encryption key;
wirelessly receive, from the second computing device, an operational command corresponding to a selected operation to be performed by the first computing device;
before wirelessly receiving the operational command from the second computing device:
wirelessly receive, from the second computing device, each of:
the update to the authentication parameter to the first computing device, wherein the update is decrypted using a private encryption key;
an updated list of one or more computing devices that are currently authorized to access the first computing device which the second computing device received from the server computing device;
replace a list of one or more computing devices that have previously been authorized to access the first computing device with the updated list from the second computing device; and
apply the update to the authentication parameter received from the second computing device, wherein applying the update to the authentication parameter configures the first computing device to perform one of the local authentication, by the first computing device, or the remote authentication, by the server computing device;
after applying the update to the authentication parameter:
attempt to process the operational command received from the second computing device; and
attempt authentication of the second computing device.

19. The one or more non-transitory computer readable media of claim 18, further comprising instructions that, when executed by the at least one processor, further cause the first computing device to:

after applying the update to the authentication parameter and before receiving the operational command from the second computing device, evaluate, whether the second computing device is authorized to access the first computing device; and based on determining that the second computing device is authorized to access the first computing device, receive the operational command from the second computing device.

20. The one or more non-transitory computer readable media of claim 19, further comprising instructions that, when executed by at least one processor, further cause the computing device to:

grant the second computing device access to the first computing device based on determining the second computing device is authorized to access the first computing device; and wirelessly receive, from the second computing device, the operational command based on the first computing device granting the second computing device access to the first computing device.

* * * * *